July 25, 1967  J. S. KAMBORIAN ETAL  3,332,096
PULLING OVER AND LASTING OF SHOES
Filed Jan. 27, 1964  15 Sheets-Sheet 6

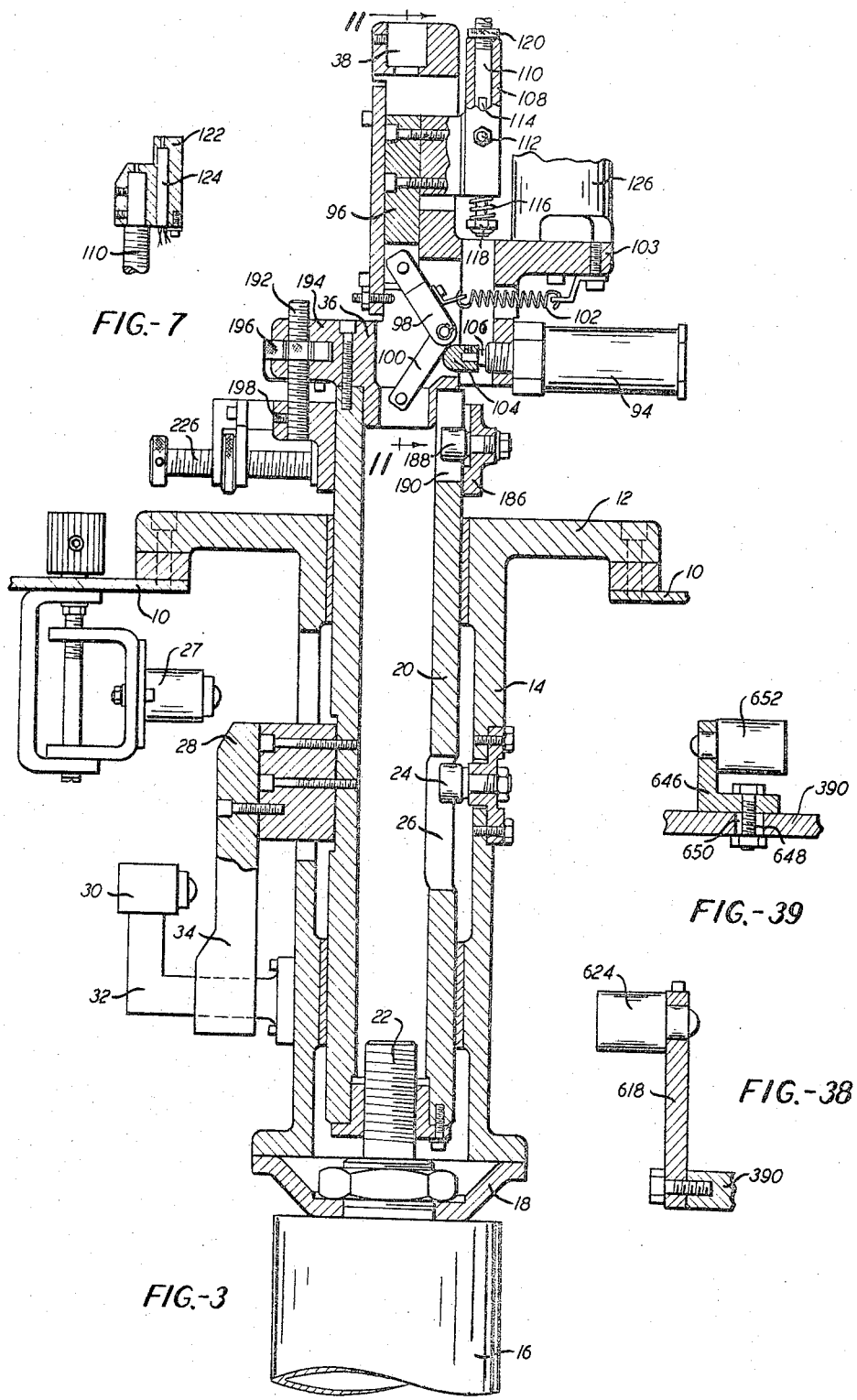

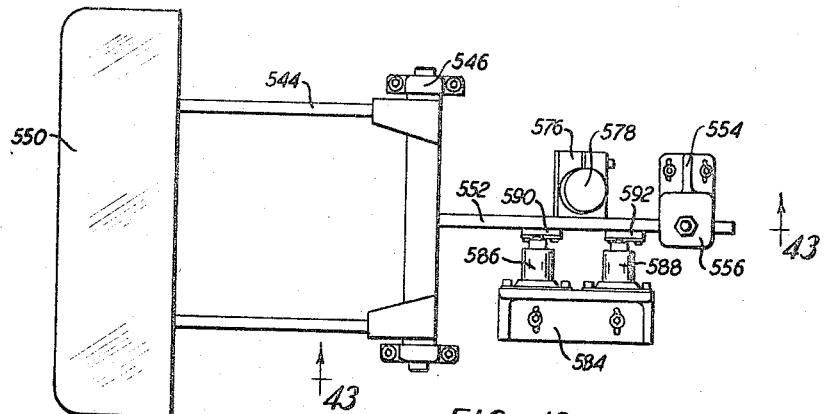
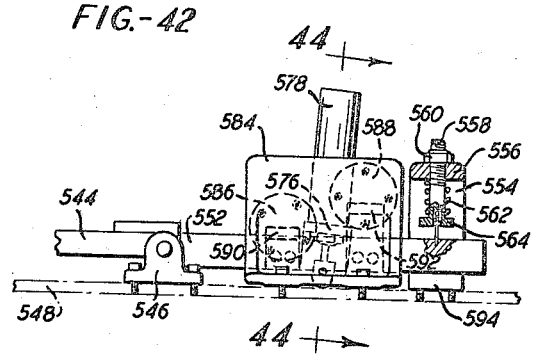
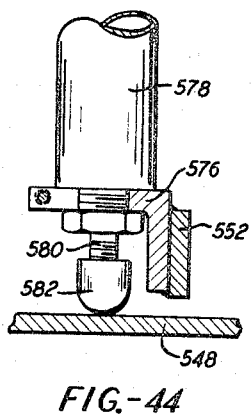
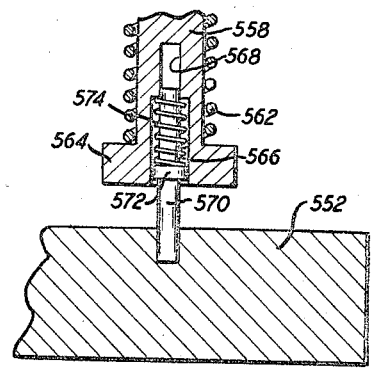
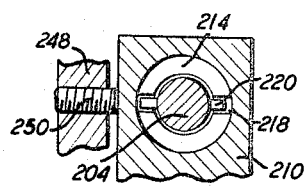
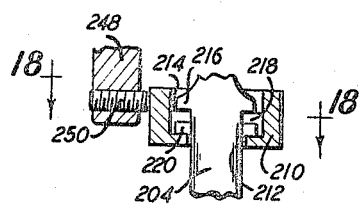

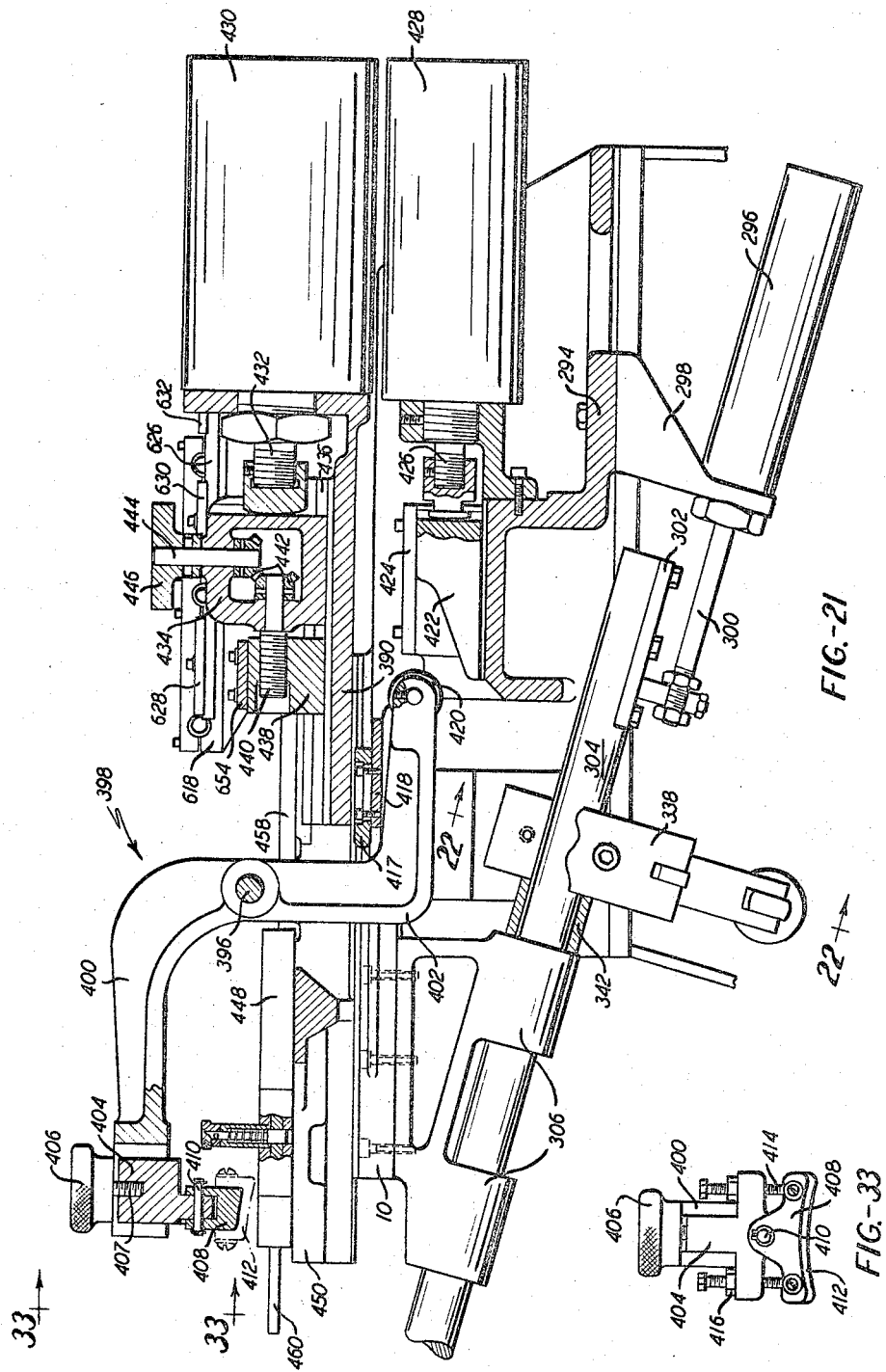

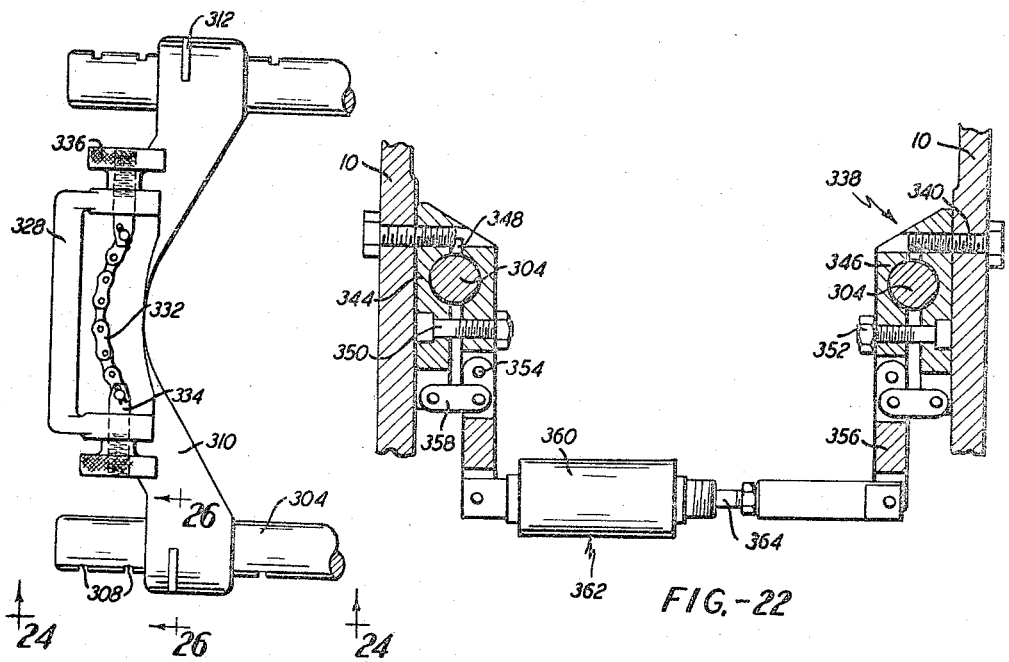
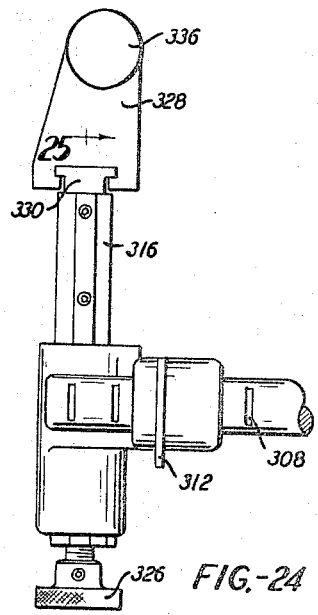
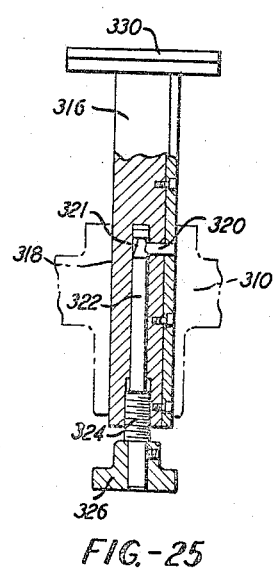
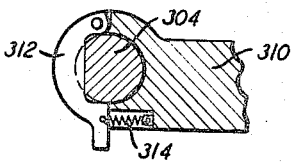

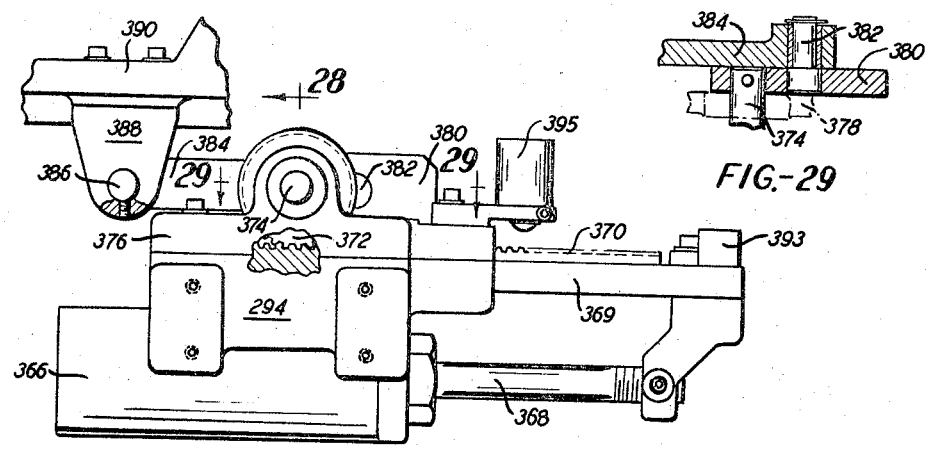
FIG.-29
FIG.-27
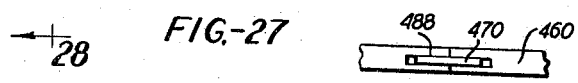
FIG.-37
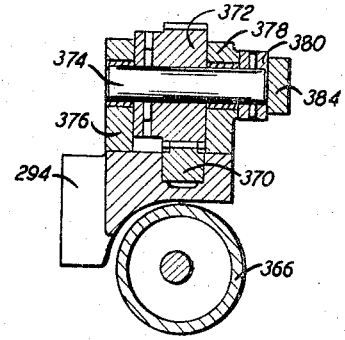
FIG.-28
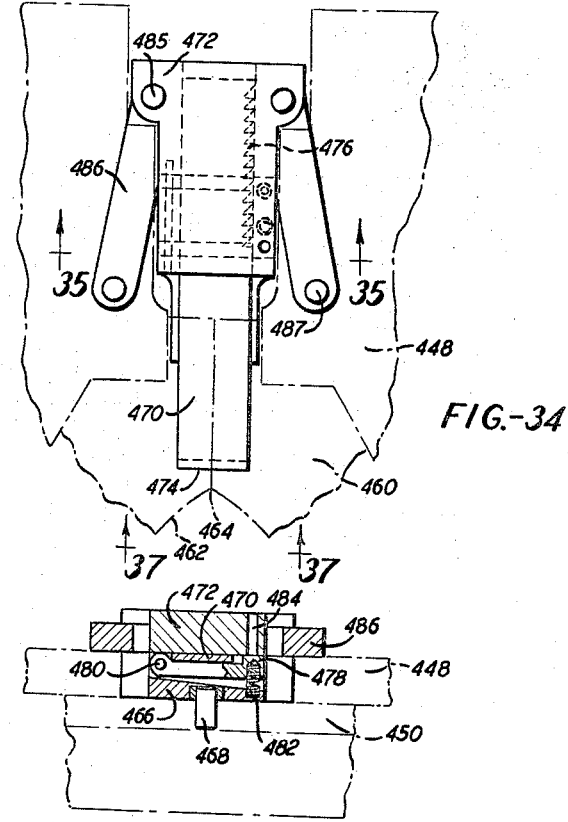
FIG.-34
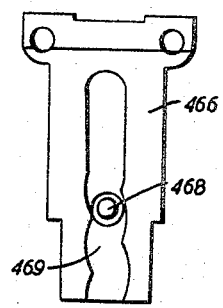
FIG.-36
FIG.-35

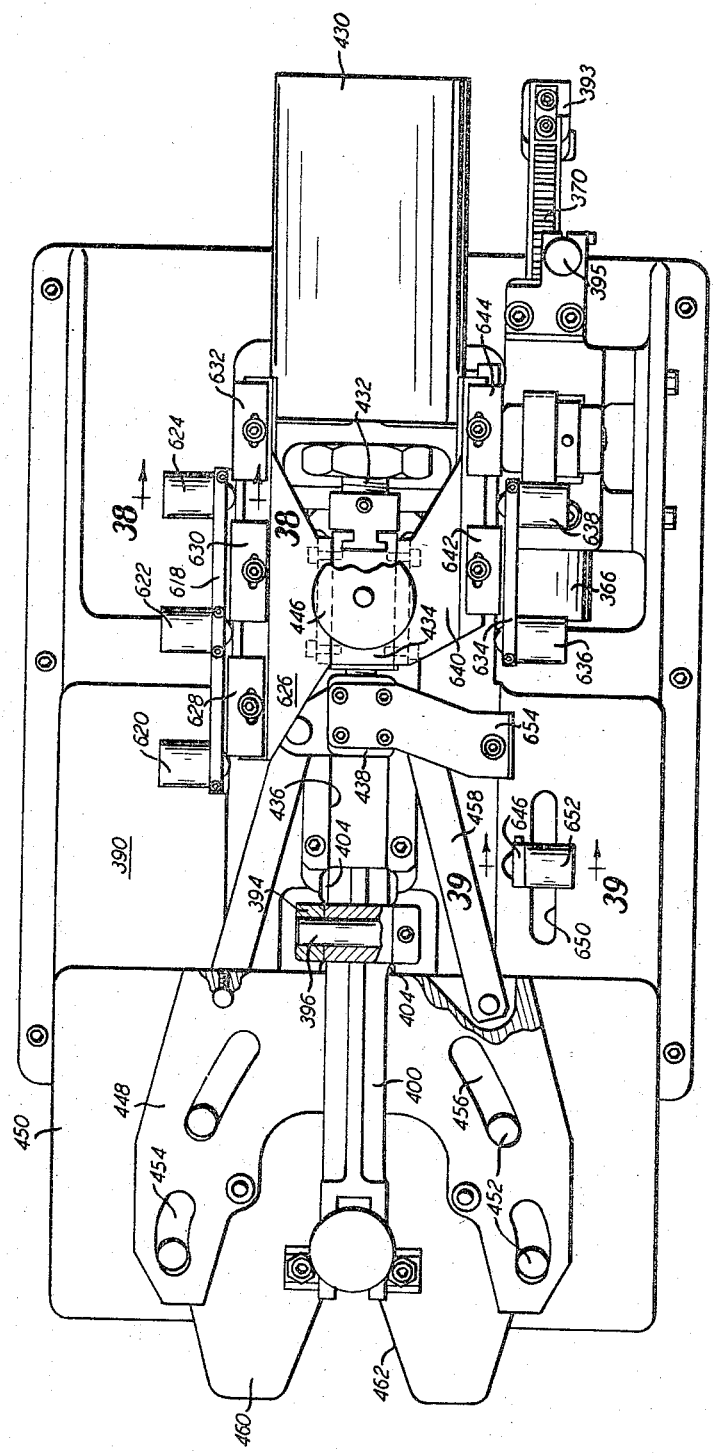

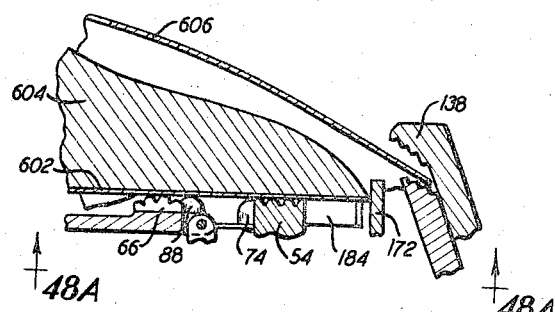
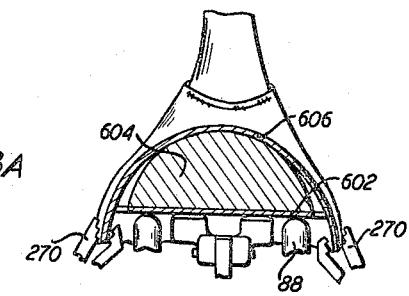
FIG.-48
FIG.-48B
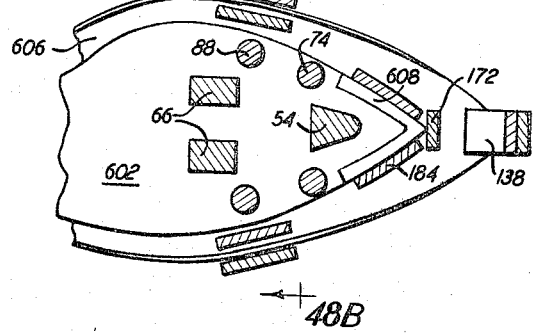
FIG.-48A
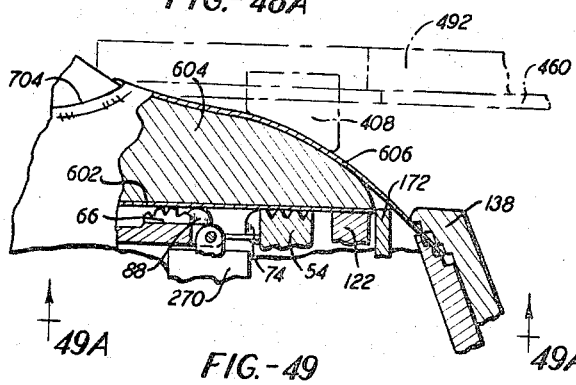
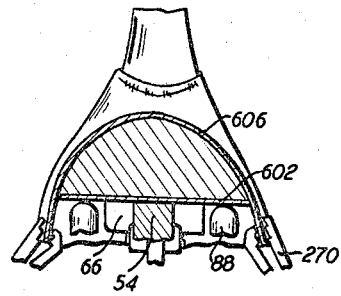
FIG.-49
FIG.-49B
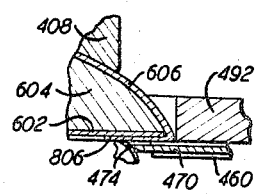
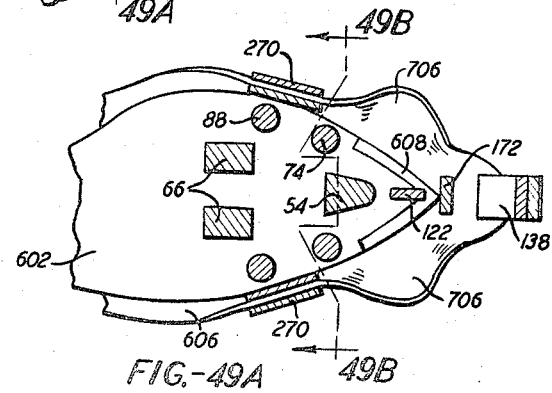
FIG.-53
FIG.-49A

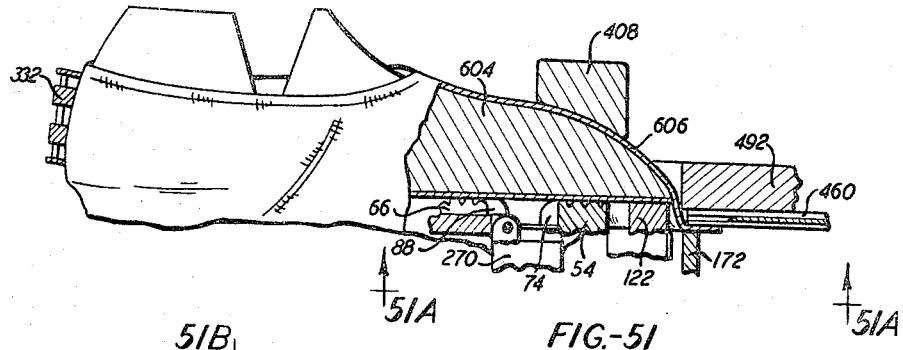
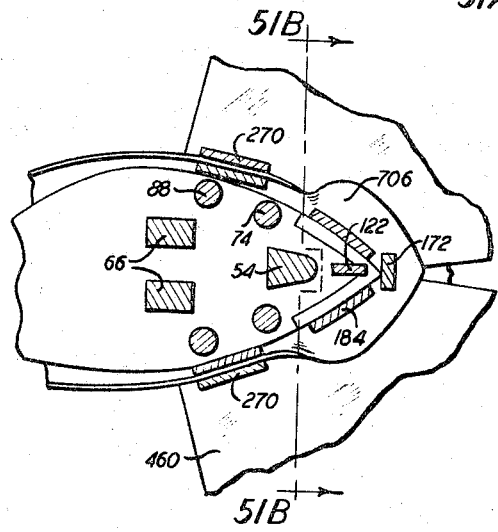
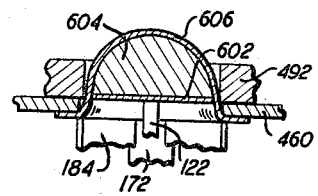
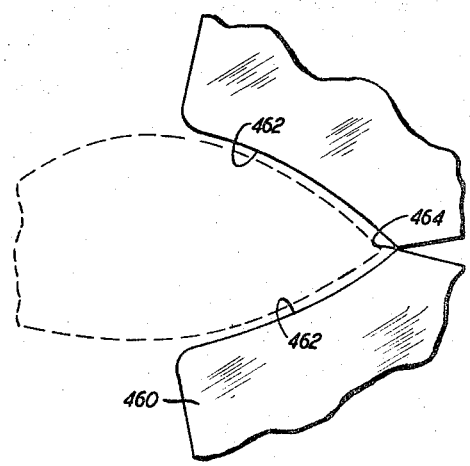
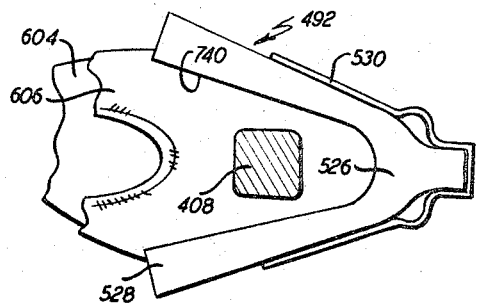

United States Patent Office 3,332,096
Patented July 25, 1967

3,332,096
PULLING OVER AND LASTING OF SHOES
Jacob S. Kamborian, 70 Crestwood Road, West Newton, Mass. 02165, and Michael M. Becka, Cambridge, and Robert B. Dunlap, Medway, Mass.; said Becka and said Dunlap assignors to said Kamborian
Filed Jan. 27, 1964, Ser. No. 340,411
87 Claims. (Cl. 12—10.5)

This invention relates to a mechanism and method for performing various operations on a shoe. In the illustrative embodiment of the invention shown in the drawings and described in the detailed description, the invention is incorporated in a machine for pulling over the toe portion of the marginal of a shoe upper mounted on a last and wiping the pulled upper margin against an insole.

The machine includes a platform for supporting bottom-down a shoe assembly that comprises the upper draped about its toe end on a last and the insole located on the last bottom. Front and side pincers are provided to grip and pull the upper about the last and front and side retarders are provided to initially position the shoe on the platform. The front retarder is positioned rearwardly of the front pincers and the side retarders are positioned between the front and side pincers. A heated toe support is provided that supports the toe end of the insole. To pull over the upper the shoe is placed on the platform with the last bearing against the retarders and the toe support in a lowered position away from the insole and the pincers are caused to grip the margin and are then downwardly moved to stretch the upper about the last. The toe support is raised to bear against the insole after the placement of the shoe assembly on the platform.

The machine includes a heel clamp and a lasting assembly that comprises wipers, a toe hold-down and a shoe conformer. The lasting assembly is initially positioned in an out-of-the-way position relatively remote from the shoe assembly so as not to interfere with the pulling over operation. After the completion of the pulling over operation the lasting assembly is moved forwardly. The forward movement of the lasting assembly enables the toe hold-down to drop onto the shoe assembly. The shoe assembly is then raised to move the toe of the shoe through the shoe conformer to thereby cause the upper to snugly conform to the shape of the last. During the rise of the shoe assembly the front pincers releases the upper margin, the front and side retarders press the margin against the wipers and the toe hold-down rides upwardly with the shoe assembly. The rise of the shoe assembly brings the insole to a position where the upper margin can be wiped against the insole and after the completion of this rise a heel clamp is forced against the heel of the shoe assembly and locked, the toe hold-down is forced downwardly against the shoe assembly under relatively light pressure and a relatively heavy pressure is exerted against the shoe assembly by the shoe conformer. The wipers are now actuated to wipe the upper margin against the insole and a knife is projected forwardly of the wipers to cut into the pleats of upper material gathered by the wipers in their movement. During the wiping movement the upper margin is released by the front and side retarders and the side pincers and the toe support and platform are lowered so that the shoe assembly is supported by the wipers. At the end of the wiper stroke the toe hold-down is forced downwardly with increased bedding pressure for a predetermined time interval and the shoe assembly is then released from the machine.

The various machine parts are operated by motors operating in a predetermined sequence by a motor control system. The movement of a pedal operated bar controls the sequencing of the motors so that movement of the bar a certain distance causes the pulling over operations to take place and further movement of the bar causes the shoe assembly to be raised and clamped in place and the wiping operations to take place.

In the accompanying drawings:
FIG. 1 is a side elevation view of the machine;
FIG. 2 is a front elevation view of the upper portion of the machine with the heel clamp omitted for purposes of clarity;
FIG. 3 is a vertical section showing the mechanism for raising the shoe assembly and the toe support;
FIG. 4 is an elevation showing the platform and toe support;
FIG. 5 is a view taken on the line 5—5 of FIG. 4;
FIG. 6 is a section taken on the line 6—6 of FIG. 5;
FIG. 7 is a section of the toe support;
FIG. 8 is a vertical section of the front pincers and front retarder;
FIG. 9 is a section taken on the line 9—9 of FIG. 8;
FIG. 10 is a section taken on the line 10—10 of FIG. 8;
FIG. 11 is a section taken on the line 11—11 of FIG. 3;
FIG. 12 is a view of a side retarder;
FIG. 13 is a horizontal plan view of the mounting for the side pincers taken on the line 13—13 of FIG. 16;
FIG. 14 is a section taken on the line 14—14 of FIG. 13;
FIG. 15 is a section taken on the line 15—15 of FIG. 13;
FIG. 16 is a section taken on the line 16—16 of FIG. 13;
FIG. 17 is an enlargement of a portion of the mechanism shown in FIG. 14;
FIG. 18 is a section taken on the line 18—18 of FIG. 17;
FIG. 19 is a vertical view of a side pincers;
FIG. 20 is a section taken on the line 20—20 of FIG. 19;
FIG. 21 is an elevation view, partly in section, of the lasting assembly and a part of the heel-clamping mechanism;
FIG. 22 is a view taken on the line 22—22 of FIG. 21 showing the heel clamp locking mechanism;
FIG. 23 is a plan view of the heel clamp;
FIG. 24 is a view taken on the line 24—24 of FIG. 23;
FIG. 25 is a view taken on the line 25—25 of FIG. 24;
FIG. 26 is a view taken on the line 26—26 FIG. 23;
FIG. 27 is an elevation view of the mechanism for moving the lasting assembly from its out-of-the-way position;
FIG. 28 is a view taken on the line 28—28 of FIG. 27;
FIG. 29 is a view taken on the line 29—29 of FIG. 27;
FIG. 30 is a section taken on the line 30—30 of FIG. 1 showing how the lasting assembly is slidably mounted in the machine frame;
FIG. 31 is a view showing how the toe hold-down is positioned when the lasting assembly is in its out-of-the-way position;
FIG. 32 is a plan view of the wipers and their driving mechanism;
FIG. 33 is a view taken on the line 33—33 of FIG. 21;
FIG. 34 is a plan view of the portion of the wipers and the knife associated with the wipers;
FIG. 35 is a section taken on the line 35—35 of FIG. 34;
FIG. 36 is a detail of a knife vibrating mechanism;
FIG. 37 is a view taken on the line 37—37 of FIG. 34;
FIG. 38 is a section taken on the line 38—38 of FIG. 32;
FIG. 39 is a section taken on the line 39—39 of FIG. 32;

FIG. 42 is a plan view of the pedal and bar for controlling the operation of the machine;

FIG. 43 is a view on the line 43—43 of FIG. 42;

FIG. 44 is a view taken on line 44—44 of FIG. 43;

FIG. 45 is a section, to an enlarged scale, of part of the mechanism shown in FIG. 43;

FIG. 48 is a representation of the shoe assembly when it is initially placed in the machine;

FIG. 48A is a view taken on the line 48A—48A of FIG. 48;

FIG. 48B is a view taken on the line 48B—48B of FIG. 48A;

FIG. 49 is a representation of the shoe assembly at the completion of the pulling over operation;

FIG. 49A is a view taken on the line 49A—49A of FIG. 49;

FIG. 49B is a view taken on the line 49B—49B of FIG. 49A;

FIG. 50 is a representation of the shoe assembly as it rises through the shoe conformer;

FIG. 51 is a representation of the shoe assembly after it has completed its rise and is about to be acted on by the wipers;

FIG. 51A is a view taken on the line 51A—51A of FIG. 51;

FIG. 51B is a view taken on the line 51B—51B of FIG. 51A;

FIG. 52 is a representation of the position of the wipers with respect to the shoe assembly before the wipers begin their wiping operation; and FIG. 53 is a representation of the knife cutting into the upper during the wiper movement.

Figure 1:
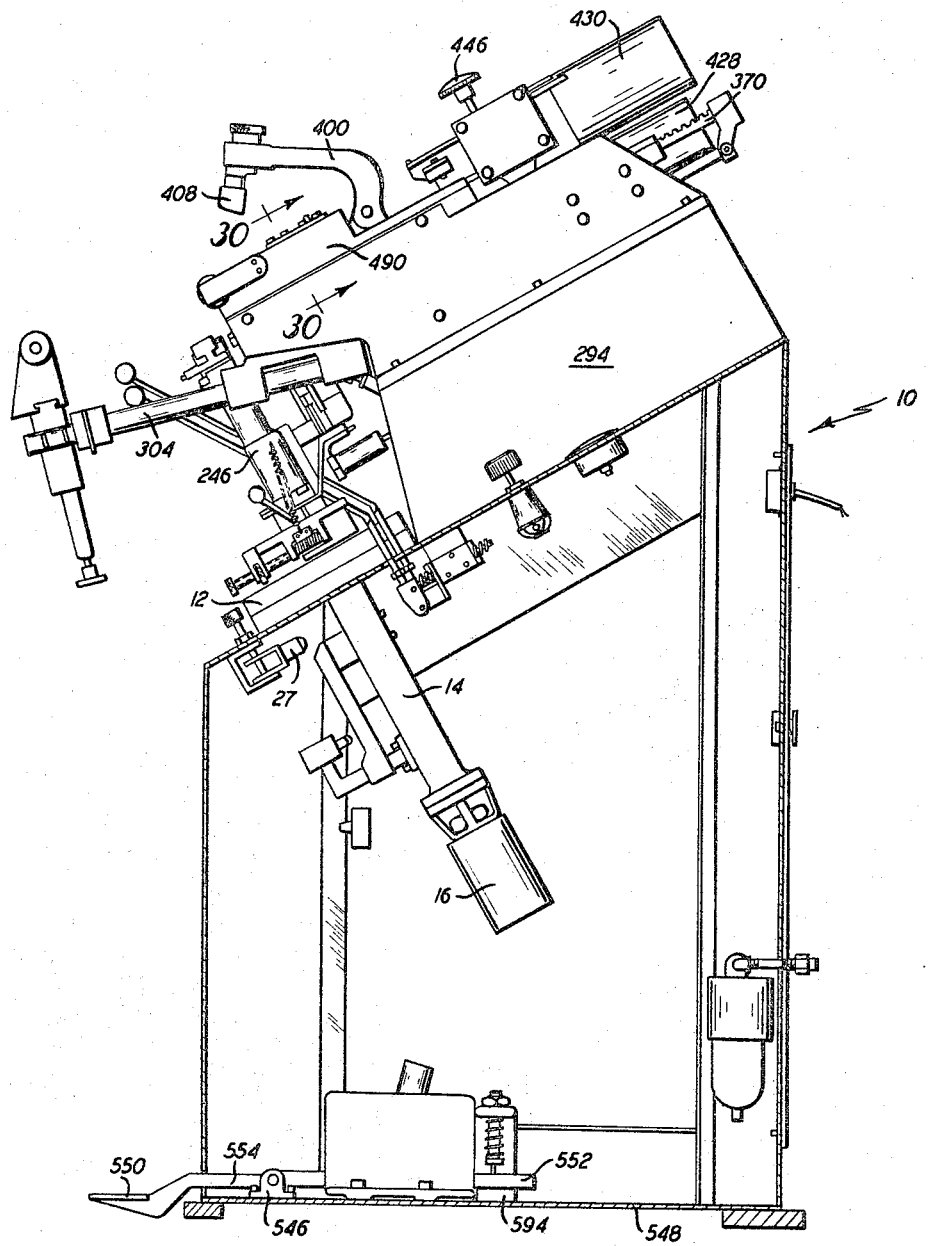
Figure 2:
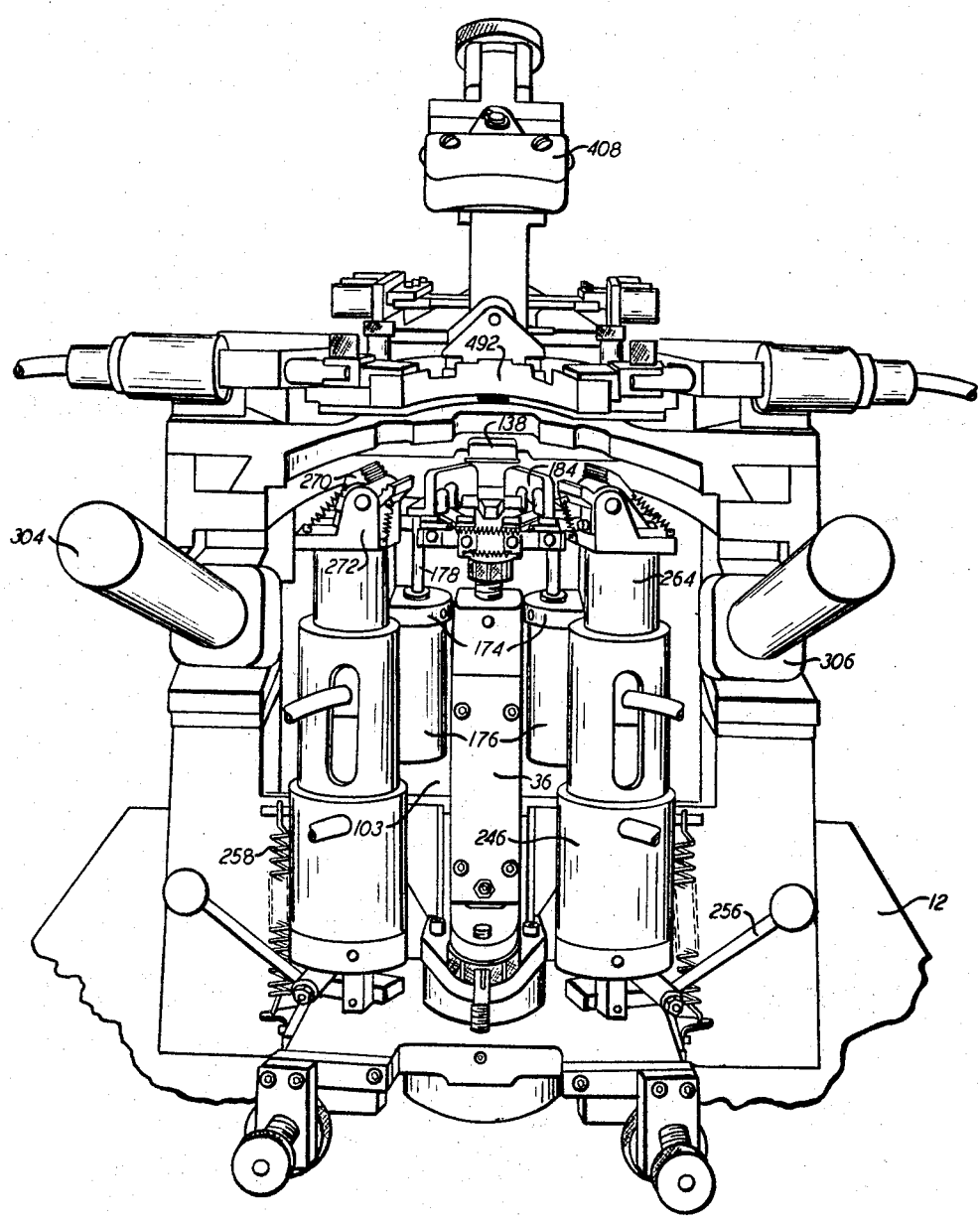

Referring to FIGS. 1–3, the machine includes a frame 10 that incorporates a base plate 12 that has a sleeve 14 extending downwardly therefrom. For convenience of operation, the machine is inclined about 30 degrees from the horizontal. However, parts extending in the direction of the plate 12 will hereinafter be referred to as extending horizontally and parts extending in the direction of the sleeve 14 will hereinafter be referred to as extending vertically. The operator is intended to be located to the left of the machine as seen in FIGURE 1, and a direction extending toward the operator (right to left in FIGURE 1) will be referred to as "forward" while a direction extending away from the operator (left to right in FIGURE 1) will be referred to as "rearward." An air operated spring return motor 16 is secured to a cap 18 at the bottom of the sleeve 14, and a toe post 20 is secured to the piston rod 22 of the motor 16 to extend vertically and be slidable within the sleeve 14. A roller 24, bolted to the sleeve 14, is received in a vertical slot 26 in the post 20 to preclude rotation of the post about the axis of the sleeve. A normally open valve 27, secured to the frame 10, is in vertical alignment with a cam 28 that is secured to the post 20. A valve 30 is connected to the sleeve 14 by way of a mounting bracket 32 and is in vertical alignment with a cam 34 that is dependent from the cam 28.

Figure 5:
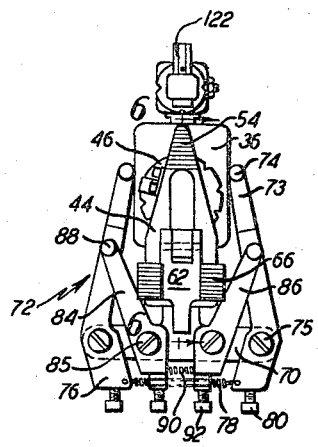
Figure 6:
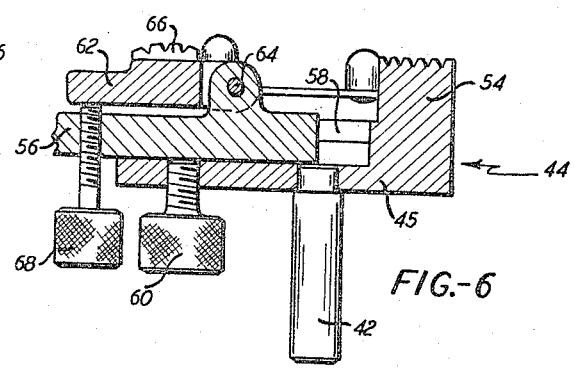

A toe post extension 36 (FIG. 3), secured to the upper end of the post 20, has a socket 38 in its upper end. A tube 40 (FIG. 4), secured in the socket 38, slidably receives a prong 42 that depends from a toe platform 44 comprising a main platform portion 45 (FIGS. 5 and 6). A nut 46 is threaded onto the tube 40, and a compression spring 48, interposed between the head of a bolt 50 threaded into the prong 42 and a shoulder 52 on the tube 40, yieldably urges the platform 44 against the top of the nut. By adjusting the nut 46, the vertical position of the toe platform may be adjusted. The platform 44 has a serrated toe insole rest 54 extending upwardly of its rear end. A platform extension 56 of the platform 45 is slidably mounted in horizontally extending gibs 58 in the main platform portion 45 and can be locked in position in the gibs by a set screw 60 that is threaded into the platform to bear against the platform extension. A leaf 62, fulcrumed to the platform extension 56 by a pivot 64, has a pair of serrated forepart insole rests 66 extending upwardly thereof. The leaf 62 rests on a stop member that takes the form of a set screw 68 that is threaded into the plaform extension 56 so that the leaf may be adjusted about the pivot 64 by manipulation of the set screw 68. The forward end of the platform extension 56 has outwardly extending branches 70. Fingers 72 are pivoted intermediate their ends to the outer ends of the branches 70 on fulcrum pins 75 for swinging movement in a horizontal plane. The rear portions 73 of the fingers 72 are formed into leaf springs that are so constructed as to be resiliently urged upwardly alongside the toe platform 44, and have upwardly extending insole support pins 74 at their rearward ends. The forward ends 76 of the fingers 72 are yieldably urged inwardly of the platform by a tension spring 78 extending between the finger ends 76. Stop members taking the form of set screws 80 which are threaded into flanges 82 depending from the finger ends 76 abut against the platform extension branches 70 to limit the extent of outward movement of the support pins 74 under the influence of the spring 78. Fingers 84 are pivoted intermediate their ends to the branches 70 on fulcrum pins 85 inwardly of the fingers 72. The fingers 84 also have rearwardly extending portions 86 that extend alongside the platform extension 56 and that are constructed in the form of leaf springs that are yieldably urged inwardly and have insole support pins 88 extending upwardly of their rearward ends. The pins 88 are yieldably urged outwardly of the platform extension 56 by a tension spring 90 extending between the forward ends of the fingers 84 and set screws 92, functioning similarly to the set screws 80, act to limit the extent of outward movement of the pins 88 under the influence of the spring 90.

Figure 4:
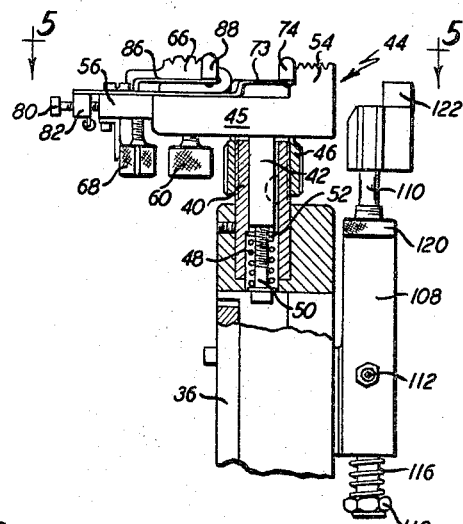

An air operated spring return motor 94 (FIG. 3) is threaded into the post extension 36. A slide 96 is slidably mounted in the post extension 36 for vertical movement and is movable by a toggle mechanism comprising a toggle link 98 that is pivoted to the slide 96 and a toggle link 100 that is pivoted to the post extension 36 and the link 98. A tension spring 102, extending between the link 98 and a rearwardly extending ledge 103 on the post extension, normally keeps the toggle links broken with the link 100 bearing against a cam 104 on the piston rod 106 of the motor 94. A housing 108, connected to the slide 96, extends rearwardly of the post extension 36. A shaft 110 is slidably mounted in the housing 108 for vertical movement and is precluded from swinging about its vertical axis by a stud 112 in the housing riding in a vertical slot 114 in the shaft. The shaft 110 is yieldably urged downwardly by a compression spring 116 interposed between the housing 108 and a nut 118 threaded onto the bottom of the shaft. A nut 120 threaded onto the shaft above the housing limits the extent of downward movement of the shaft. A shoe end support or toe support 122, made of a heat conductive material, is affixed to the upper end shaft 110 to extend rearwardly of the toe platform 44 (FIGS. 4, 5 and 7). An electric cartridge heater 124 is embedded in the toe support 122.

Figure 8:
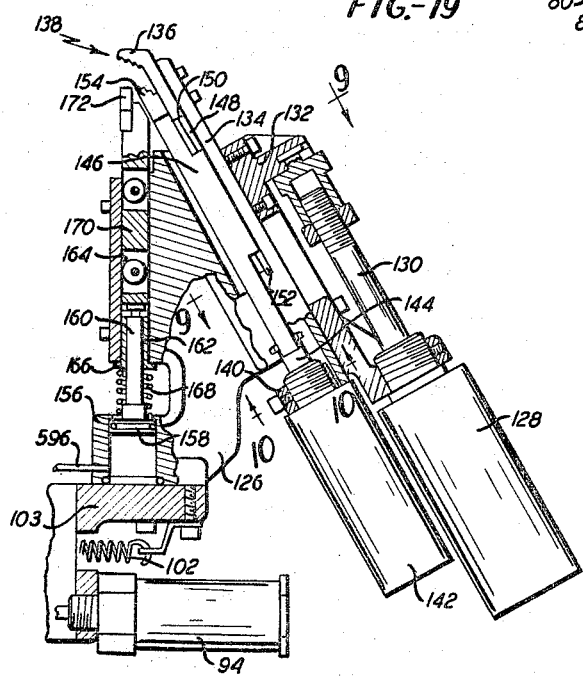
Figure 9:
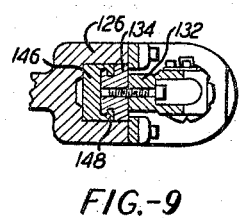
Figure 10:
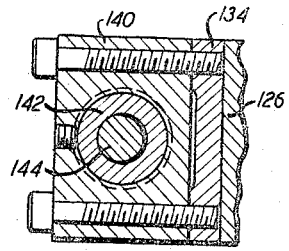

A housing 126 is secured to and extends upwardly of the ledge 103 (FIG. 8). An air operated motor 128, secured to the housing 126, has a piston rod 130 extending upwardly and forwardly thereof. A block 132 is secured to the piston rod 130, and a bar 134 is rigidly connected to the block. The bar 134 is slidably mounted in a guideway in the housing 126. The upper jaw 136 of a front pincers or gripper 138 is secured to the upper end of the bar 134. The lower end of the bar 134 is secured to a bracket 140 on which an air operated spring return motor 142 is threaded. The piston rod 144 of the motor 142 is connected to a bar 146 that is slidable in ways 148 formed in the bar 134 between the respective upper and lower extremities 150 and 152 of the ways. The lower jaw 154 of the pincers 138 is mounted on the upper end of the bar 146. Above the ledge 103, the housing 126 is formed into a cylinder 156 in which a piston 158 is vertically movable. A piston rod 160, extending upwardly of the piston 158 is slidable in a bushing 162 that is slidable in the lower end of a vertical guideway 164 formed at the front of the housing 126 above the cylinder 156. A shoulder 166 is provided on the lower end of the bushing 162 and bears against the housing 126. A compression spring 168, interposed between the shoulder 156 and the piston 158, yieldably seats the shoulder against the housing bottom and yieldably urges the piston downwardly against the force of the pressurized air that is normally in the cylinder 156. A bar 170, connected to and extending upwardly of the rod 160, is slidable in the guideway 164, and a front retarder blade 172 is affixed to the top of the bar 170. The pincers 138 and the retarder blade 172 are both positioned rearwardly of the toe support 122 and the toe platform 44.

Figure 11:
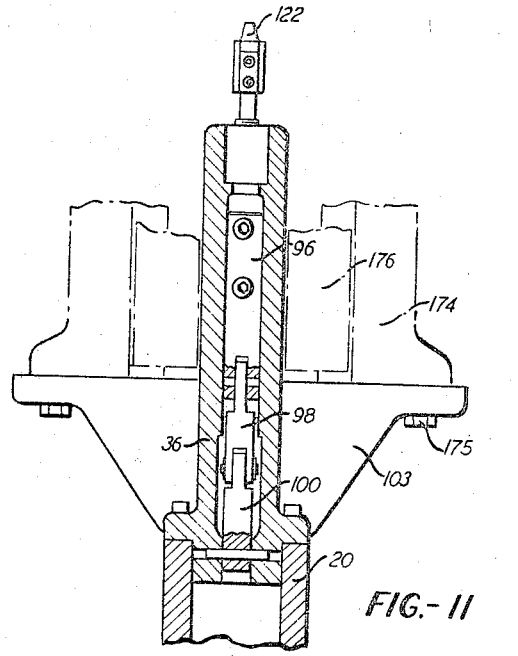
Figure 12:
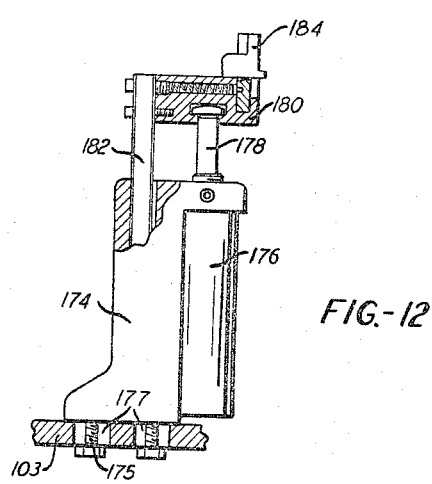
Figure 16:
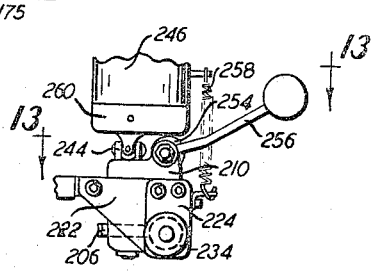

A column 174 is bolted to and extends upwardly of the ledge 103 forwardly of the housing 126 and on each side of the toe support 122 and toe platform 54, by means of headed bolts 175 extending through slots 177 in the ledge and threaded into the columns (FIGS. 2, 11 and 12). An air operated motor 176, connected to each column has a piston rod 178 extending upwardly thereof on which is mounted a block 180. A bar 182, extending downwardly from each block 180, is slidably guided in its associated column 174. A side retarder blade 184 is secured in each block 180. The columns 174 and retarder blades 184 may be adjusted inwardly and outwardly by adjusting the positions of the bolts 175 in the slots 177.

Figure 13:
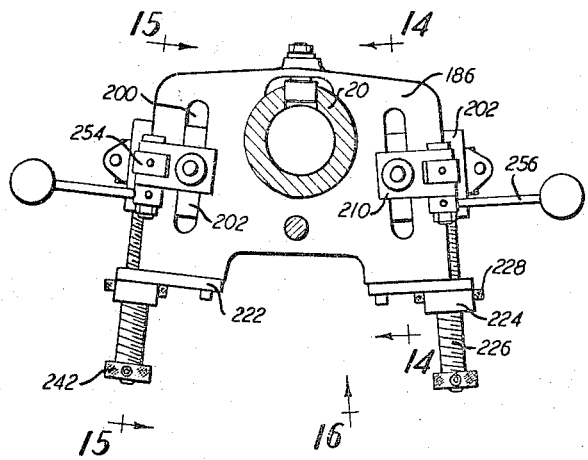
Figure 15:
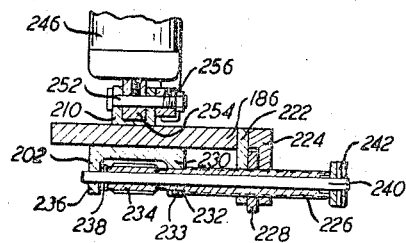
Figure 14:
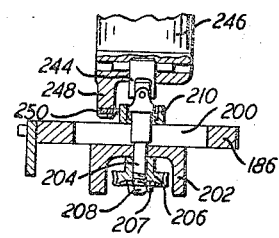

A base 186 (FIG. 3) is slidably mounted on the toe post 20 below the toe post extension 36 and above the plate 12 by way of a roller 188 secured to the base and extending into a vertically extending slot 190 in the post. A bolt 192, extending through a flange 194 on the toe post extension 36 is threaded into a nut 196 that is rotatably mounted in the flange. The bottom of the bolt 192 is threaded into the base 186 and is locked thereto by a set screw 198. Thus, rotation of the nut 196 causes vertical adjustment of the base 186 on the post 20. The base 186 has a pair of rearwardly converging slots 200 extending therethrough on opposite sides of the post 20 (FIG. 13). A cup-shaped block 202 is located below the base 186 straddling each slot 200 (FIGS. 13–18). A pin 204 extends through each block 202 and slot 200. A pinion 206 is fixed to each pin 204 for rotation therewith by a cross-pin 207 and each pinion is clamped between the bottom of a block 202 and a nut 208 threaded to the bottom of each pin 204. A stop plate 210 is located above the base 186 to straddle each slot 200. Each stop plate has a bore 212 through which its associated pin 204 extends and a counterseat 214 which seats a shoulder 216 of the pin. A pair of grooves 218 in the base of each counterseat 214 receives prongs 220 that extend radially outwardly of each pin 204. A flange 222 extends downwardly of the plate 186 forwardly of each slot 200 and a sleeve 224 is located forwardly of each flange. A hollow stud 226 extends through each flange 222 and sleeve 224, and is threaded onto a nut 228 sandwiched between the flange and sleeve. The rearward end of each stud 226 extends through a downwardly extending leg 230 of its associated block 202 with a shoulder 232 on the stud bearing against the leg and is pinned to the leg by a set screw 233. A worm 234, that is in mesh with its associated pinion 206, is located between each stud 226 and another downwardly extending leg 236 of each block 202 and is pinned by a pin 238 to a rod 240 that extends through each stud 226 and worm 234. A knob 242 is pinned to each rod 240. Rotation of a nut 228 causes axial shifting of its associated stud 226 and thereby shifts the associated block 202 lengthwise of a slot 200 to shift and adjust the position of each pin 204 and the members carried thereby lengthwise of the slot. Rotation of a knob 242 will rotate its associated worm 234 to thereby rotate the pinion 206 in mesh therewith thus swinging the associated pin 204 about its axis.

A universal joint 244 is connected to the upper end of each pin 204 and an air actuated motor 246 which acts as a side pincers carrier, is connected to and extends upwardly of the top of each joint 244. A lug 248 extending downwardly of each motor 246 has a stop member in the form of a set screw 250 threaded therein that is adapted to bear against the associated stop plate 210. A shaft 252, rotatably mounted in each stop plate 210, has an eccentric cam 254 and a handle 256 pinned thereto. A tension spring 258 extending between each motor 246 and the base 186 serves to yieldably urge the base 260 of each motor 246 against a cam 254.

Figures 19, 20:
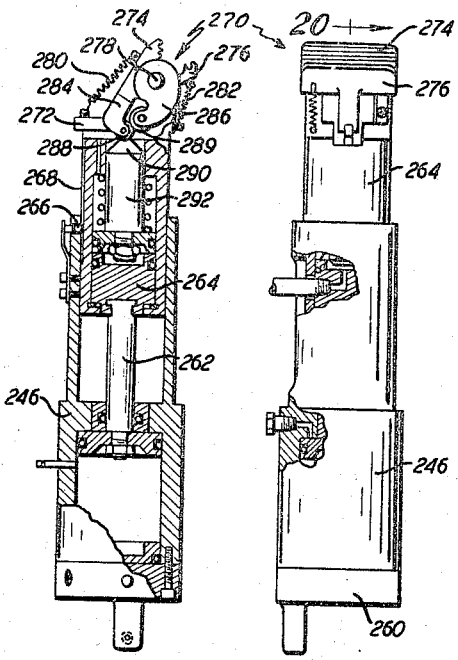

Referring to FIGS. 19 and 20, the piston rod 262 of each motor 246 has a spring return air actuated motor 264 connected thereto that is slidably mounted in the motor 246. A spring urged detent 266 riding in a groove 268 of each motor 264 precludes rotation of the motors 264 with respect to the motors 246. A side pincers or gripper 270 is mounted on a bracket 272 that is affixed to the top of each motor 264. Each pincers 270 comprises an upper jaw 274 and a lower jaw 276 that are swingable about a pin 278 mounted in the bracket 272. Tension springs 280 and 282 respectively extending from the jaws 274 and 276 to the bracket 272 serve to yieldably urge the jaws to open position. The jaws 274 and 276 respectively have downwardly extending legs 284 and 286 respectively having rollers 288 and 289 thereon that are positioned above a cone-shaped cam 290 formed at the top of the piston rod 292 of each motor 264. The legs 284 extend downwardly of the legs 286 so that the rollers 289 are at a higher elevation than the rollers 288.

The frame 10 includes a head 294 (FIG. 21) located rearwardly of the aforementioned parts. An air actuated motor 296 is secured to a hanger 298 depending from the head 294. The piston rod 300 of the motor 296 is connected by way of a plate 302, to a pair of bars 304 (FIG. 2) that are slidably guided in bosses 306 affixed to the frame 10. Referring to FIGS. 22–26, a plurality of notches 308 are provided at spaced intervals at the forward ends of the bars 304. A yoke 310, straddling the bars 304, has catches 312 pivoted thereon that are yieldably urged into a selected notch 308 by tension springs 314 extending between the yoke and the catches. A post 316 is slidably guided for height-wise movement in a bore 318 in the center of the yoke 310. The post 316 is locked in adjusted position in the bore 318 by a radially movable plunger 320 in the post that can be forced radially outwardly against the wall of the bore 318 by way of the cone-shaped end 321 of an axially extending stud 322 in the post 316. The stud 322 is screwed into the post by a thread 324 and has a handle 326 at its bottom whereby rotation of the handle in one direction causes a rise of the stud end 321 to force the plunger 320 radially outwardly to lock the post 316 in position in the bore 318 and rotation of the handle in the other direction unlocks the post. A heel clamp mount 328 is slidably mounted on a dovetailed slide 330 located at the top of the post 316. A heel clamping chain 332 is pinned at its ends to screws 334 which screws are threaded into knobs 336 so that the curvature of the chain may be adjusted by manipulating the knobs.

Intermediate their ends, the bars 304 extend through brakes 338 that are bolted to the frame 10 by fasteners 340 and are separated from the bosses 306 by spacer sleeves 342 loosely mounted on the bars 304. Each brake 338 is formed of an outer leg 344 bearing against the frame 10 and an inner leg 346 with the legs embracing the bars 304. The legs are separated by a kerf 348 above the bars 304 which provides sufficient flexibility as to enable the legs 346 to be moved toward and away from the legs 344. A bolt 350, seated in each leg 344 extending through its associated leg 346, has a nut 352 threaded thereon to limit the extent of inward movement of the legs 346 away from the legs 344. The lower ends of the legs 346 are pivotally connected by pins 354 to limbs 356. A link 358 is pivoted at one end to each limb 356 below the pins 354 and is pivoted at its other end to each leg 344. The lowermost end of one of the limbs 356 is pivotally connected to the cylinder 360 of an air actuated motor 362 and the lowermost end of the other limb 356 is pivotally connected to the piston rod 364 of the motor 362, the motor 362 acting as a drive mechanism.

Figure 30:
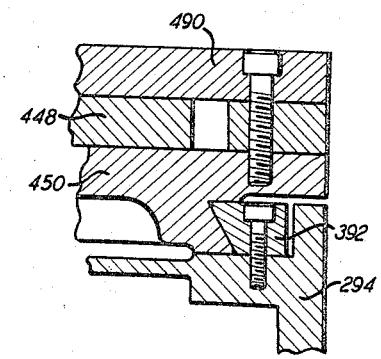

Referring to FIGS. 27–29, an air actuated motor 366, that is secured to the head 294, has a piston rod 368 extending rearwardly thereof. The piston rod 368 is secured to a bar 369 that is slidably mounted in the head 294 above the piston rod. A rack 370 mounted on the bar 369 is in mesh with a pinion 372 that is pinned to a shaft 374 and the shaft is rotatable in a pair of trunnions 376 and 378 affixed to the head 294. A crank 380, pinned to the shaft 374, is pivotally connected by a pin 382 to a pitman 384, and the pitman 384 is pivotally connected by a pin 386 to a lug 388 that depends from a slide plate 390. The slide plate 390 is slidably mounted for forward and rearward movement in the head 294 on gibs 392 (FIG. 30). A cam 393 mounted on the bar 369 is in alignment with a valve 395 mounted on the head 294.

Figure 31:
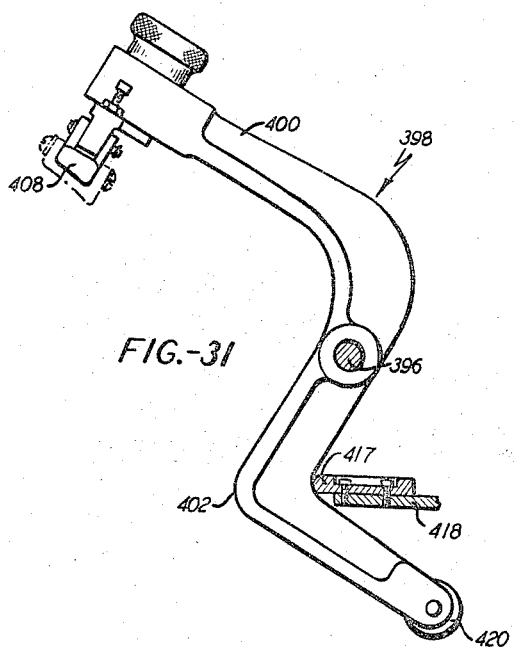

Referring to FIGS. 21 and 32, a pair of trunnions 394, upstanding from the slide plate 390, mount a pin 396 on which is swingably mounted a hold-down lever 398. The lever 398 has a forward leg 400 extending upwardly and forwardly of the pin 396 and a rearward leg 402 extending downwardly of the pin 396 through a cut out 404 in the slide plate 390 and then rearwardly. The leg 400 at its forward end has a bracket 404 slidably mounted therein for heightwise movement (FIG. 33). The position of the bracket in the leg is adjustable by rotating a knob 406 which has a screw 407 extending downwardly therefrom that is threaded into the bracket. A toe hold-down 408 is pivoted to the bracket 404 by a pin 410 for swinging movement about a horizontal axis extending lengthwise of the machine. The hold-down 408 includes a hold-down pad 412 located on its bottom. A pair of bolts 414 are pivoted to the ends of the hold-down 408 and extend upwardly thereof through the bracket 404 and can be locked in adjusted position by lock nuts 416. When the slide plate 390 is in its rearward position, the leg 402 abuts against a striker plate or abutment 417 that is adjustably secured to a plate 418 that forms a part of the head 294 and the hold-down 408 is in an elevated position (FIG. 31). The weights of the legs 400 and 402 and their radial dimensions with respect to the pin 396 are such that the lever 398 normally swings clockwise about the pin 396 until the leg 402 bears against the striker plate 417. The rearward end of the leg 402 has a roller 420 thereon. Rearwardly of the roller 420, a cam 422 is provided that is slidably guided for horizontal movement between the head 294 and a cap 424 bolted to the head and is secured to the piston rod 426 of an air operated motor 428 that is secured to the head.

Referring to FIGS. 21 and 32, an air actuated motor 430 is secured to the slide plate 390 above the motor 428. The piston rod 432 of the motor 430 is connected to a housing 434 that is slidably mounted in gibs 436 formed in the slide plate 390. A block 438 is slidably mounted in the gibs 436 forwardly of the housing 434 and is connected to the housing by a bolt 440 that is threaded into the block and extends rearwardly therefrom into the housing. The bolt 440 is connected by bevel gears 442 within the housing 434 to a pin 444 that extends upwardly of the housing. A knob 446 is secured to the pin 444. A pair of symmetrically disposed wiper cams 448 are slidably supported on a thickened block 450 at the forward end of the slide plate 390. The block 450 has pins 452 upstanding therefrom that extend into slots or cam tracks 454 and 456 formed in the wiper cams. Forwardly diverging links 458 are pivotally connected at their rear ends to the block 438 and at their forward ends to the wiper cams 448.

Wipers 460 are connected to and extend forwardly of the wiper cams 448. The wipers, as is conventional, are flat plates having forwardly divergent surfaces 462 that diverge from a vertex 464 (FIGS. 34 and 52).

Referring to FIGS. 34–37, the contiguous faces of the wiper cams 448 are spaced to accommodate a bracket 466 that rests on the block 450. The wipers and wiper cams constitute wiping units. A pin 468 is fitted into and extends upwardly of the block 450 and is received in an undulating slot 469 formed in the bottom of the bracket 466. A knife 470 is received between the bracket 466 and a cap 472 that overlies and is secured to the bracket. The knife has a sharpened edge 474 at its forward end and a plurality of ratchet teeth 476 at one of its sides that are engageable by a pawl 478. The pawl is pivotally mounted by a pin 480 to the bracket 466 and is resiliently urged upwardly into locking engagement with a selected ratchet tooth 476 by a compression spring 482. An access hole 484 is provided in the cap 472 above the pawl 478 through which a pin may be inserted to depress the pawl and thereby disengage it from the ratchet. The knife 470, the bracket 466 and the cap 427 constitute a knife unit. A pair of links 486 are pivotally connected to the rear of the cap 472 at each side thereof by pivots 485 and extend forwardly and divergently therefrom. The forward ends of the links 486 are pivotally connected to the wiper cams 448 by pivots 487. The knife 470 extends into cut-outs 488 provided in the adjoining surfaces of the wipers 448 rearwardly of the vertex 464.

Referring to FIGS. 21, 32, 38 and 39, a plate 618 that is secured to one side of the slide plate 390 has three valves 620, 622 and 624 mounted therein. A bracket 626 that is bolted to the housing 434 adjustably mounts three cams 628, 630 and 632 that are respectively in alignment with the stems of the valves 620, 622 and 624. A plate 634, similarly secured to the other side of the slide plate 390, has two valves 636 and 638 mounted therein. A bracket 640 that is bolted to the housing 434 adjustably mounts two cams 642 and 644 that are respectively in alignment with the stems of the valves 636 and 638. An angle 646 adjustably secured in the slide plate 390 by way of a bolt 648 extending through an elongated slot 650 in the slide plate, has a valve 652 mounted therein. A striker plate 654, mounted on the block 438, is in alignment with the stem of the valve 652.

Figure 40:
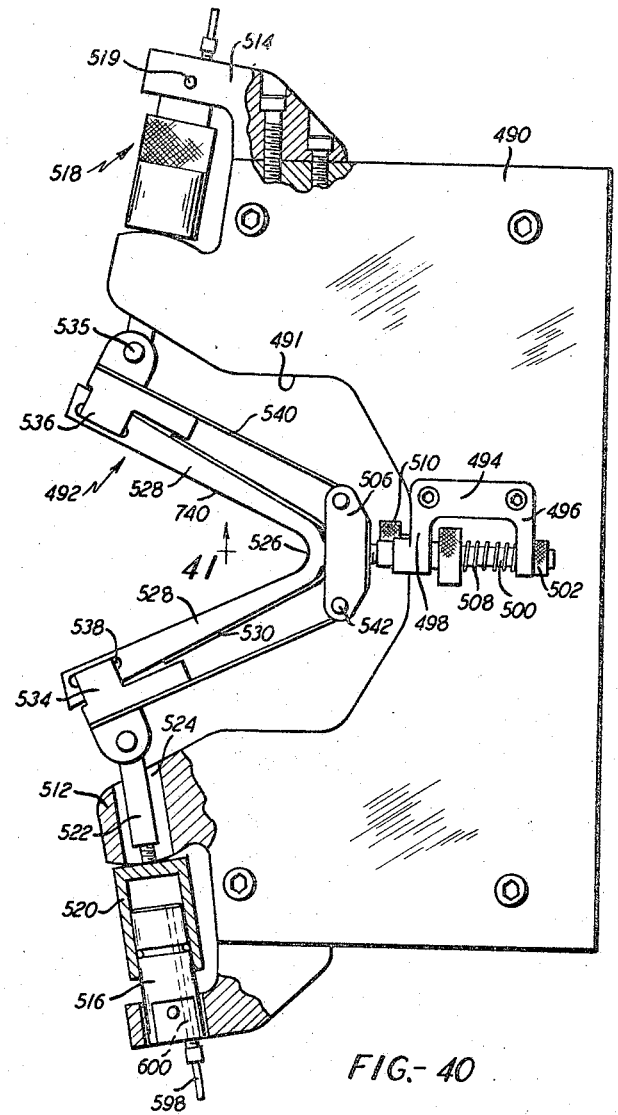
FIG. 40 is a plan view of the shoe conformer.
Figure 41:
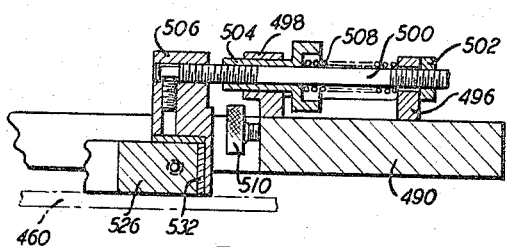
FIG. 41 is a section taken on the line 41—41 of FIG. 40.

A cover block 490 is secured to the block 450 and extends above the wiper cams 448 (FIGS. 1 and 30). Referring to FIGS. 40 and 41, the block has a cut-out 491 at its forward end to accommodate a flexible shoe conforming pad or yoke 492. A U-shaped bracket 494, having a rear leg 496 and a front leg 498, is bolted to the block 490. A stud 500 extending through the legs has a stop nut 502 threaded thereon rearwardly of the leg 496. A sleeve, that is formed as a nut 504, is threaded on the stud 500 and is slidably guided in the front leg 498. The forward end of the stud 500 is threaded into and secured to a yoke mounting bracket 506. The rearward end of the nut 504 is formed into a cup that receives a compression spring 508 which is coiled about the stud 500 and extends between the nut 504 and the leg 496. A stop screw 510 is threaded into the block 490 under the stud 500 and rearwardly of the bracket 506. The block 490 is formed into inner flanges 512 at the forward ends of the cut-out 491, and outer flanges 514 are bolted to the block. The piston 516 of an air actuated motor 518 is pivotally secured to each flange 514 by a pin 519 to extend inwardly thereof and a cylinder 520 is slidable on each piston 516 with the cylinder normally abutting against its adjacent flange 512. A rod 522 connected to each cylinder extends inwardly thereof through an opening 524 extending through its associated flange 512.

The yoke 492, which is constructed similarly to the ones disclosed in pending application Ser. No. 193,829 filed May 10, 1962, now Patent No. 3,237,224, and Patent No. 3,060,468, is of substantially U-shape and has a bight 526 and a pair of legs 528 extending forwardly of the bight on opposite sides of the bight. The yoke is made of a flexible, deformable material such as Teflon and has a pair of bowed springs 530 extending exteriorly of each yoke leg from the bight forwardly thereof. The bight 526 of the yoke is received in a socket 532 in the bracket 506. A support arm 534, that is pivoted to the inner end of each rod 522 by a pivot pin 535 has a downturned lip 536 that is inserted into a slot 538 in each yoke leg 528. Each support arm 146 has a spring arm 540 secured thereto and extending rearwardly thereof that is entwined at its rear end on a pin 542 located in the mounting bracket 506. Reference is made to the aforesaid application Ser. No. 193,829 for a more detailed disclosure of the mounting of the yoke 492. The yoke 492 is located in the machine directly above the wipers 460.

Referring to FIGS. 1, 42, 43 and 45, a control pedal 544 is pivotally mounted in trunnions 546 that are secured to a base plate 548 forming a part of the frame 10. The forward end of the pedal has a platform 550 adapted to be stepped on by the foot of the operator. The portion of the pedal extending rearwardly of the trunnions 546 is formed into a bar 552. A bracket 554, bolted to the plate 548, has a flange 556 overlying the rear end of the bar 552. A stud 558 is movable through the flange 556 and its downward movement is limited by a nut 560 on the stud that normally engages the top of the flange. A compression spring 562, interposed between the bottom of the flange 556 and a collar 564 on the bottom of the stud 558, yieldably urges the stud to its lower normal position. The bottom of the stud 558 has bore 566 extending upwardly from its bottom and a bore 568, of smaller diameter than the bore 566, extending upwardly of the bore 566. A pin 570 has a collar 572 thereon that is slidable in the bore 566. The lower end of the pin 570 is seated in a hole in the bar 552 and the upper end of the pin is slidable in the bore 568. A compression spring 574, interposed between the top of the bore 566 and the collar 572, acts to yieldably urge the pin 570 downwardly. The spring 574 is weaker than the spring 562.

An L-shaped flange 576 (FIG. 44) is welded to the bar 552 between the bracket 554 and the trunnions 546. A spring return air actuated motor 578 is clamped to the flange 576 and has a piston rod 580 extending downwardly thereof. A button 582 on the bottom of the piston rod 580 bears against the base plate 548. A bracket 584, bolted to the base plate 548, has a pair of valves 586 and 588 thereon whose valve stems are respectively in alignment with cams 590 and 592 mounted on the bar 552. The valve 588 is at a higher elevation than the valve 586.

The pedal 544 is so constructed as to normally swing clockwise (FIG. 43) so that the bar 552 is seated on a beam 594 secured to the base plate 548.

In the preparation of the machine, the aforementioned machine parts are adjusted where necessary to accommodate them to the particular size and shape of shoe and last being operated on.

In the idle condition of the machine, the motor 16 and the toe platform carried thereby are in a lowered condition, the motor 94 is in the FIG. 3 position so that the toe support 122 is in a lowered position, the front pincers 138 are open with the jaw 136 in its uppermost position, due to the projection of the piston rod 130 upwardly of the motor 128 and the retraction of the piston rod 144 in the motor 142, pressurized air is entering the cylinder 156 through a line 596 to raise the piston rod 160 and the front retarder 172 with respect to the housing 126 against the resistance of the spring 168, the side retarders 184 are held in a raised position by the motors 176, the motors 246 are held against the cams 254 in an outward position by the springs 258 and are held by gravity in a forward position with the set screws 250 bearing against the stop plates 210 due to the inclination from the vertical of the motors 246 (FIG. 1), the piston rods 262 of the motors 246 are in an elevated position and the motors 264 are in a lowered position with respect to the piston rods 262 so that the side pincers 270 are in a raised position with their jaws open, the piston rod 300 is projected forwardly of the motor 296 so that the heel clamp 332 is in a forward position, the piston rod 364 is projected outwardly of the cylinder 360 of the motor 362 so that the brakes 338 are in unlocking position with respect to the bars 304, the piston rod 368 is projected rearwardly of the motor 366 so that the slide plate 390 and the parts carried thereby are in a rearward out-of-the-way position, the leg 402 of the hold-down lever 398 is in engagement with the plate 418, the piston rod 426 is retracted within the motor 428 so that the cam 422 is in the FIG. 21 position disengaged from the roller 420, the piston rod 432 is retracted within the motor 430 so that the wipers 460 are in their rearward open position, the spring 508 yieldably urges the bight 526 of the yoke 492 forwardly with the nut 502 bearing against the rear leg 496 and pressurized air under relatively light pressure is entering the motors 518 through lines 598 and ports 600 in the pistons 516 to thereby force the cylinders 520 against the flanges 512 and place the yoke 492 in the FIG. 40 position, and the piston rod 580 is retracted within the motor 578 so that the pedal 554 is in the FIG. 43 position with the bar 552 seated on the beam 594.

Referring to FIGS. 48, 48A and 48B, a shoe assembly is presented bottom-down to the machine to be pulled over and toe lasted. The shoe assembly comprises a shoe insole 602 located on the bottom of a last 604, preferably by being tacked thereto, and a shoe upper 606 draped over the last. The shoe has preferably been heel seat lasted by an apparatus such as that shown in pending application Ser. No. 107,156 filed May 2, 1961, which has matured into Patent No. 3,189,924. Immediately before presentation to the machine, a ribbon of molten thermoplastic cement 608 had been deposited on the margin of the toe end of the insole by an apparatus such as that shown in pending application Ser. No. 280,259 filed May 14, 1963, now Patent No. 3,241,517. The insole is brought to bear against the insole rests 54 and 66 and the support pins 74 and 88 and the last is brought to bear against retarders 172 and 184. The support pins resiliently bear against the margins of the insole to ensure that the insole in these regions is pressed firmly against the bottom of the last. The front and side retarders 172 and 184 respectively act as front and side gauges to properly locate the shoe assembly in the machine. The toe end of the upper margin is placed between the open jaws of the front pincers 138 and the forepart portions of the upper margin are inserted between the open jaws of the side pincers 270.

Figure 46:
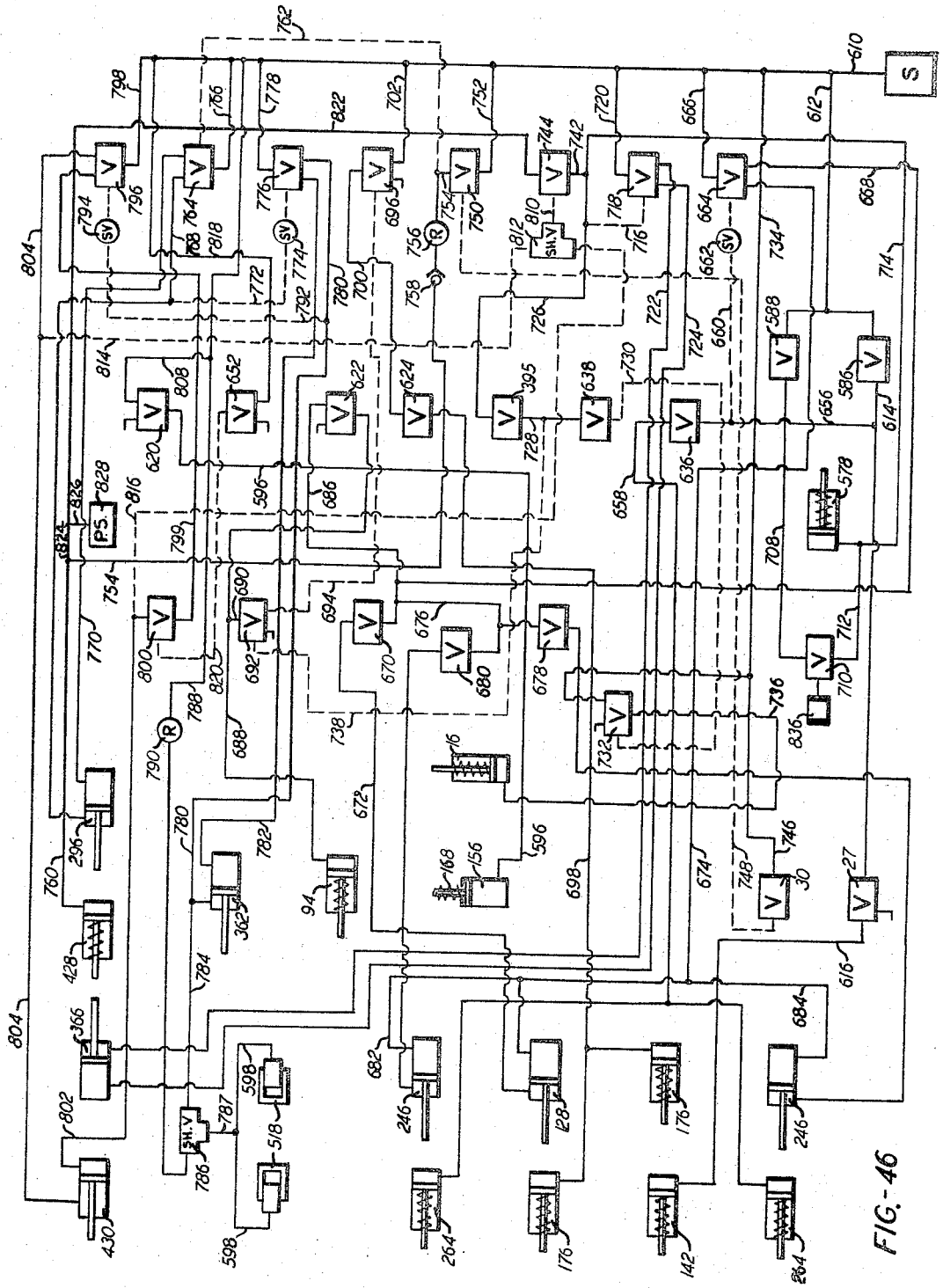
FIG. 46 is a schematic diagram of the control circuit of the machine.

The operator now steps on the platform 550 an amount sufficient to raise the bar 552 against the relatively light force of the spring 574 until the bar bears against the collar 564. Due to the fact that the spring 562 is stronger than the spring 574, the operator can feel when members 552 and 564 engage. This rise of the bar causes the cam 590 to open the normally closed valve 586. Referring to the schematic circuit diagram of FIG. 46 wherein the source of air for the pneumatic control system is designated as S, the pressure lines are drawn in solid lines and the pilot lines are drawn in dashed lines, the opening of the valve 586 enables pressurized air to flow from the source, through lines 610 and 612, the valve 586, a line 614, the aforementioned normally open valve 27 and a line 616 to the motor 142 to cause the motor 142 to raise the piston rod 144 to thereby raise the bar 146 in the ways 148 and cause the pincers jaw 154 to close against the pincers jaw 136 and enable the toe portion of the upper margin to be gripped by the front pincers 138. At the same time, pressurized air passes from the line 614, through a line 656, the aforementioned normally open valve 636 and a line 658 to the motors 264 to actuate the motors to raise the cones 290 to first lower the jaws 274 and then raise the jaws 276 and thereby cause the side pincers 270 to grip the forepart portions of the upper margin.

The control system includes a plurality of sequence valves that are so constructed as to offer resistance to the passage of air therethrough so that the air will follow an alternate path other than through the sequence valve if one is available. When such an alternate path is not available or is blocked, the air will go through the sequence valve. An example of such a sequence valve is designated by reference numbers 420 through 448 in the aforementioned application Ser. No. 107,156.

After the motors 142 and 264 have been actuated to respectively close the pincers 138 and 270, pressurized air flows from the line 656, through a pilot line 660 and a sequence valve 662 to shift a valve 664. This enables pressurized air to pass from the line 610, through a line 666, the valve 664, a line 668, a valve, 670 and a line 672 to the motor 128 to actuate the motor to move the front pincers 138 downwardly and rearwardly away from the last, at an angle of approximately 30 degrees from the vertical, to thereby stretch the toe portion of the upper margin about the toe end of the last. Prior to the shifting of the valve 664, pressurized air had flowed from the line 666, the valve 664, and a line 674 to the motor 128 to maintain the motor in its idle position. At the same time, pressurized air flows from the valve 664, through the line 668 and a line 676 and valves 678 and 680 to the two motors 246 to actuate these motors to move the side pincers downwardly to thereby stretch the forepart portions of the upper margin about the last. Prior to the shifting of the valve 664, pressurized air had flown from the line 674 and branch lines 682 and 684 to the motors 246 to maintain these motors in their idle position. At the same time, pressurized air passes from the valve 664 and the line 668 through a line 686, the aforementioned normally open valve 622 and a line 688 to the motor 94 to actuate this motor to raise the heated toe support 122 and bring it to bear against the insole at its toe end. At the same time, pressurized air branches off from the line 688 through a line 690, a normally open valve 692 and a pilot line 694 to shift a valve 696 to thereby enable the air in the motors 176 to be exhausted to atmosphere through a line 698, the aforementioned valve 624, a line 700 and the valve 696 and thus enable the springs in the motors 176 to lower the piston rods 178 and the side retarders 184. Prior to the shifting of the valve 696, the retarders 184 had been maintained in their raised position by pressurized air passing from the line 610, through a line 702, the valve 696, the line 700, the valve 624 and the line 698 to the motors 176.

The machine now comes to a stop with the shoe assembly engaging parts in the position shown in FIGS. 49, 49A and 49B.

The aforesaid downward and rearward movement of the front pincers 138 causes the upper 606 to be pulled and stretched about the toe end of the last and also in a heel to toe direction. The downward movement of the side pincers 270 causes the upper at the forepart to be stretched tightly about the last. The universal joints 244 enable the motors 246 and the side pincers 270 carried thereby to swing rearwardly towards the toe of the shoe assembly and inwardly of the shoe assembly towards each other during the downward movement of the side pincers. Due to the inclination from the vertical of the motors 246 as shown in FIG. 1, these motors and the side pincers are normally tilted from the vertical to a position where the set screws 250 engage the stop plates 210, and the set screws ride off the stop plates during the toeward movement of the motors 246 and side pincers 270. The bases 260 of the motors 246 ride off the cams 254 during the inward movement of the motors 246 and side pincers 270. These toeward and inward movements are occasioned by the direction of pull of the front pincers 138, and the mounting of the side pincers 270 that permits their toeward and inward movement prevents the side pincers from fighting against the toe pincers during their upper stretching movements. The result of the aforesaid pincers movements is a tight stretching of the upper about the toe and forepart of the last with the topline 704 (FIG. 49) of the upper stretched tightly on the last. During the stretching movement of the front pincers 138, the toe end portion of the upper 606 is forced about the front retarder 172 and forces the front retarder down to some extent against the yieldable force provided by the pressurized air in the cylinder 156. The front retarder 172, by engaging the toe end of the last, prevents rearward or toeward movement of the shoe assembly during the stretching movement of the front pincers 138. Since the front pincers 138 and side pincers 270 are driven in their stretching movements by yieldable forces created by air pressure, they terminate these movements when the stretching forces are equalized by the resistance to stretching of the upper. The portions of the stretched upper margin between the front and side pincers are outspread into dog ears 706 (FIG. 49A).

The toe support 122 bears against the insole adjacent its toe end to force the insole against the bottom of the last in this region and prevent it from drooping downwardly of the last bottom. Since the portion of the insole engaged by the support 122 has previously been coated with the ribbon of cement 608 it is undesirable to have the support in its upper position when the shoe is first presented to the machine as this would cause smearing of the cement due to the rubbing of the insole 602 across the support when the shoe assembly is first positioned on the members 54, 66, 74 and 88 with the last positioned against the retarders 172 and 184. By having the support rise against the insole after the shoe assembly has been positioned in the machine, the smearing of the cement is avoided. The support 122 is heated by the heater 124 as, if the support were cold, the metal out of which it is formed would prematurely set the molten thermoplastic cement ribbon 608.

At any time up to this point in the machine cycle the operator may release the platform 550 to thereby close the valve 586 and return the machine parts to their idle positions. The operator may decide to do this if the upper is not being pulled over properly. The machine may also include mechanism (not shown) similar to that disclosed in pending application Serial No. 231,756 filed Oct. 19, 1962, now Patent No. 3,233,261 for individually and selectively increasing or decreasing the downwardly directed forces of the front pincers 138 and side pincers 270 to thereby relocate the upper 606 on the last 604 if he is not satisfied with its position when the parts are in the FIGS. 49, 49A and 49B position.

The operator may now further depress the platform 550 to thereby cause the bar 552 to rise further against the force of the spring 562 and cause the cam 592 to open the normally closed valve 588 while the cam 590 continues to maintain the valve 586 open. The opening of the valve 588 causes pressurized air to flow from the line 612 through the valve 588, a line 708, a normally open solenoid actuated valve 710 and a line 712 to the motor 578 to actuate this motor to force its piston rod 580 and the button 582 downwardly against the plate 548 so as to maintain the bar 552 in the position the operator had placed it with the valves 586 and 588 closed. The operator may now take his foot off the platform 550 for the rest of the machine cycle. At the same time, pressurized air passes through the line 712, a line 714 and a pilot line 716 to a valve 718 to shift this valve. Shifting of the valve 718 enables pressurized air to flow from the line 610, a line 720, the valve 718, and a line 722 to the motor 366 to actuate this motor to cause the piston rod 368, through the above described linkage shown in FIGS. 27–29, to move the slide plate 390 from its rearward out-of-the-way position to a forward working position. Prior to the shifting of the valve 718 the motor 366 had kept the slide plate 390 in its idle out-of-the-way position by pressurized air passing from the line 720, through the valve 718 and a line 724 to the motor 366. The forward movement of the slide plate 390 brings the wipers 460 and the yoke 492 to a position where they can act on the shoe assembly as indicated in phantom in FIG. 49. The forward movement of the slide plate also causes the lever leg 402 to leave the striker plate 417 so that the lever 398 swings counter-clockwise (FIG. 21) and the hold-down 408 swings downwardly by gravity until it engages the shoe assembly in the region of the top of the forepart of the upper and last, also indicated in phantom in FIG. 49. It is desirable to keep the wipers, yoke and holddown in an out-of-the-way position up to this time so that they will not interfere with the placement of the shoe assembly in the machine and the operation of the above-described pulling over operation and so that the operator will be able to see if the pulling over operation is being properly performed. At the same time pressurized air flows through the lines 712 and 714 and a line 742 to a valve 744 which is closed at this time to block the air by the below-described mechanism.

The actuation of the motor 366 causes forward movement of the bar 369 whereby the cam 393 opens the normally closed valve 395 toward the end of the forward movement of the slide 390. The opening of the valve 395 causes pressurized air to flow from the line 714 through a line 726, the valve 395, a line 728, the aforementioned normally open valve 638 and a pilot line 730 to a spring loaded pilot valve 732 thereby shifting this valve. The shifting of the valve 732 enables pressurized air to pass from the line 610, through a line 734, the valve 732 and a line 736 to the motor 16 to actuate this motor to raise the toe post 20 and the parts carried thereby. At the same time, air passes from the valve 395 through a pilot line 738 to the valve 692 to shift this valve to closed position. Closure of the valve 692 blocks the flow of air from this valve through the pilot line 694 to the valve 696 with the air in the line 694 exhausting to atmosphere through the valve 692. This results in the valve 696 again shifting to place the lines 702 and 700 in communication and causing pressurized air to flow to the motors 176 through the line 700, the valve 624 and the line 698 to thereby cause the motors 176 to raise the side retarders 184. The machine parts are so constructed that the toe post terminates its upward movement when the insole rests 54 and 66 raise the shoe assembly to a position where the bottom of the insole 602 is above the top of the wipers 460 an amount that is substantially equal to the thickness of the upper 606. During the rise of the shoe assembly the toe holddown 408 rises upwardly with it with the lever 398 swinging clockwise (FIG. 21) about the pin 396.

The shoe assembly was initially so placed on the insole rests 54 and 66 that when the yoke 492 was moved to its forward working position the edges of the last 604 overlapped the inner wall 740 of the yoke 492 as indicated in FIG. 50. When the shoe assembly is forced upwardly by the motor 16 the yoke wall 740 is initially compressed. When the wall can no longer be compressed, the bight 526 of the yoke flexes rearwardly against the pressure exerted by the spring 508, and the yoke legs 528 flex outwardly against the pressure exerted by the springs 530. After this, the support arms 534 and the spring arms 540 swing outwardly about the pins 542 and move the cylinders 520 outwardly over the pistons 516 against the yieldable force of the pressurized air in the cylinders.

During the latter movement, there is relative swinging movement between the rods 522 and the support arms 534 about the pins 535 and relative swinging movement between the pistons 516 and the flanges 514 about the pins 519. The yieldable pressure exerted by the pressurized air in the cylinders 520, the springs 530 and 508 and the spring arms 540 and the aforementioned swinging movements cause the yoke 492 to snugly engage the upper 606 and cause the upper to snugly conform to the shape of the last during the upward movement of the last.

During the rise of the toe post 20, the cam 28 closes the aforementioned normally open valve 27. This shuts off the supply of pressurized air that had gone to the motor 142 from the line 616 and allows the air in the motor 142 to vent through the valve 27 so that the spring in the motor actuates the motor to lower the jaw 154 and open the front pincers 138 to thereby release the toe portion of the upper margin. As soon as the pincers 138 is disengaged from the upper margin, the pressurized air entering the motor 128 through the line 672 causes the front pincers 138 to move further downwardly so that the pincers will not interfere with the wipers 460 during the rise of the toe post 20. As soon as the front pincers 138 release the toe portion of the upper margin, it is pressed by the front retarder 172 against the bottom of the wipers 460.

Towards the end of the rise of the toe post 20, the cam 34 opens the aforementioned normally closed valve 30 to cause pressurized air to flow from the line 734, a line 746, the valve 30 and a pilot line 748 to a valve 750 to open this valve. The opening of the valve 750 causes pressurized air to pass from the line 610, through a line 752, the valve 750, a line 754, a relatively low pressure regulator 756, a check valve 758 and a line 760 to the motor 428 to actuate this motor to move the cam 422 forwardly and engage the roller 420 thereby swinging the lever 398 counter-clockwise (FIG. 21) causing the holddown 408 to press downwardly against the forepart of the shoe assembly under relatively light pressure. At the same time, pressurized air passes from the line 754, through a pilot line 762 to shift a valve 764. The shifting of the valve 764 causes pressurized air to flow from the line 610, through a line 766, the valve 764 and a line 768 to the motor 296 to actuate this motor to move the bars 304 rearwardly and thereby bring the heel clamp 332 to bear against the heel of the shoe assembly. Prior to the shifting of the valve 764, pressurized air had flowed from the line 766, through the valve 764 and a line 770 to the motor 296 to maintain the motor in its idle position.

After the actuation of the motor 296, pressurized air flows from the line 768 through a pilot line 772 and a sequence valve 774 to shift a valve 776. The shifting of the valve 776 causes pressurized air to flow from the line 610, a line 778, the valve 776 and a line 780 to the motor 362 to actuate this motor to retract the piston rod 364 into the cylinder 360 and thus apply the brakes 338 against the bars 304 to lock the heel clamp 332 in position. Prior to the shifting of the valve 776, pressurized air had passed from the line 778, through the valve 776 and a line 782 to the motor 362 to maintain this motor in its idle condition with the brakes 338 open. At the same time, pressurized air flows from the line 780, a line 784, a shuttle valve 786, a line 787, and the lines 598 to the motors 518 to force the cylinders 520 inwardly under relatively high line pressure and thereby forcing the inner wall 740 of the yoke 492 against the toe and forepart of the shoe assembly under relatively high line pressure. Up to this time the cylinders 520 had been urged inwardly under relatively low pressure by pressurized air passing from the line 610, through a line 788, a low pressure regulator 790 in the line 788, the shuttle valve 786, the line 787 and the lines 598. The shuttle valve 786 is a standard commercial item that is so constructed that when air enters its two entrance ports at different pressures, the higher pressure air flows from its entrance port through the exit port and the lower pressure air is blocked at its entrance port.

The parts now assume the position shown in FIGS. 51, 51A and 51B.

The parts are so constructed that the raising of the retarder blades 184 during the rise of the post 20 causes the retarders to engage the dog ears 706 and press them against the bottoms of the wipers with the resilient force afforded by the motors 176 at about the time that the bottom of the insole 602 is level with the bottoms of the wipers. The release of the toe-end of the upper margin by the front pincers 138 during the rise of the post 20, as stated above, causes the front retarder 172 to immediately press this portion of the upper margin against the wiper bottoms. This arrangement permits the front pincers to be lowered before it can interfere with the wipers and enables the front retarder to engage the upper margin without losing any of the stretch in the upper that has been provided by the front pincers 138. During the final increment of the movement of the toe post 20 after the retarders 172 and 184 pressed the upper margin against the wiper bottoms the upper is further stretched about the last and when the upper can no longer be stretched the pressed margin portions slip between the wiper bottoms and the retarders.

As aforesaid, the yoke 492 causes the upper to snugly conform to the shape of the last during the rise of the shoe assembly. The conforming pressure of the yoke is relatively light due to the relatively light air pressure entering the motors 518 so as to enable the yoke legs 528 to yieldably move outwardly as the shoe assembly passes through them. The upper 606 is firmly clamped to the last 604 after the shoe assembly has completed its rise for the subsequently performed wiping operation by means of the yoke 492 due to the relatively heavy air pressure entering the motors 518, by the application and locking of the heel clamp 332 and by the forcing of the toe pad 408 downwardly against the forepart of the shoe assembly.

After the above-described actuation of the motors 362 and 518, pressurized air passes from the line 780, through a pilot line 792 and a sequence valve 794 to shift a valve 796. This enables pressurized air to pass from the line 610, through a line 798, the valve 796, a line 799, a valve 800 and a line 802 to actuate the motor 430 to move the wipers 460 in their wiping stroke. Prior to the shifting of the valve 796, the pressurized air had entered the motor 430 through the line 798, the valve 796 and a line 804 to maintain the wipers in their retracted position.

The aforesaid actuation of the motor 430, through the housing 434, block 438 and links 458 causes the wiper cams 448 and the wipers 460 carried thereby to move with respect to the block 450 with the pins 452 riding in the cam tracks 454 and 456 in a path determined by the configurations of the cam tracks 454 and 456. The configuration of the cam tracks is such that when the pins 452 are at the forward or left end (FIG. 32) of the cam tracks and have relative movement toward the right or rear end the wipers are first swung toward each other about the vertex 464 through an arc of about 4 degrees for each wiper or a total of 8 degrees. This is followed by a compound movement comprising a concomitant forward translatory movement of the wipers and inward swing movement of the wipers about the vertex. This is followed, at the conclusion of the wiper stroke, by a forward translation of the wipers without swinging movement. In setting up the machine for the particular size and shape of shoe assembly to be operated on, the knob 446 is rotated to shift the block 438 along the gibs 436 and thus swing the wipers 460 about the vertex 464 within the range permitted by the above described cam track configuration so that the divergent wiper surfaces 462 will be spaced close to the sides of the shoe assembly when the wipers are positioned to start their wiping stroke thereby enabling the wipers to move only a short distance in their wiping stroke before engaging the upper. The concomitant forward translation and inward swinging of the wipers causes them to engage the upper margin while the upper is tightly stretched about the last, wipe or fold the margin against the insole 602 and bond the margin to the insole by means of the ribbon of cement 608 on the insole. During the compound movement, there is a greater inward swinging movement of the wipers than a forward translation so as to enable the wiper surfaces 462 to move inwardly of the last edge a greater distance along the sides of the last than the distance traversed by the vertex 464 along the extreme tip end of the last. After the surfaces 462 have crossed over the last sides a sufficient amount to fold the upper margin against the insole, the final exclusively translatory movement causes the vertex 464 to move across the tip of the last to wipe the tip of the upper margin against the insole. It has been found that this sequence of movements, especially in sharp or pointed toe shoes, ensures that the extreme toe end of the upper where the greatest stresses are created is firmly wiped against the insole.

At the beginning of the wiper stroke, the knife edge 474 is located rearwardly of the vertex 464. The inward swinging movement of the wiper cams 448 about the vertex 464 causes the links 486 to drag the knife 470 forwardly with respect to the wipers along the block 450 and project its edge 474 forwardly of the vertex at about the time or shortly after the vertex crosses under the insole due to the pivots 487 moving forwardly a lesser distance than the pivots 485. The knife edge 474 therefore cuts into the pleated material 806 of the upper 606 gathered by the wipers at the toe end of the shoe by the inward movement of the wipers to relieve the stress therein similarly to the function performed by the knife in Patent No. 3,082,447, (see FIG. 53). During the forward movement of the knife along the block 450 the pin 468 moves along the undulating slot 469 to cause the knife edge 474 to vibrate laterally or sidewise to thereby cause the knife to have a draw cutting or slicing effect in its cutting operation and thereby enhance its cutting action.

During the inward movement of the wipers the pins 74 and 88, which heretofore had supported the marginal edges of the forepart portions of the insole, are engaged by the wipers as the wipers cross under the insole and are moved inwardly by the wipers against the force of the springs 78 and 90.

As the wipers perform their wiping stroke, the valves 620, 622, 624, 636 and 638 are respectively and successively closed by the cams 628, 630, 632, 642 and 644 and the valve 652 is then shifted by the striker plate 654.

Prior to the closing of the valve 620 pressurized air had passed from the line 610, a line 808, the valve 620 and the aforementioned line 596 to the cylinder 156 to maintain the front retarder 172 in its upper position. The closing of the valve 620 causes the spring 168 to lower the piston 158 and the retarder 172 with the pressurized air in the cylinder 156 venting through the line 596 and the valve 620.

The closing of the valve 622 shuts off the flow of pressurized air to the motor 94 through the line 688 and allows the spring in the motor 94 to retract the cam 104 with the pressurized air in the motor 94 venting to atmosphere through the line 688 and the valve 622 so that the spring 102 lowers the heated toe support 122.

The closing of the valve 624 shuts off the flow of pressurized air to the motors 176 through the line 698 and allows the springs in these motors to lower the side retarders 184.

The closing of the valve 636 shuts off the flow of pressurized air to the motors 264 through the line 658 and allows the springs in these motors to lower the piston rods 292 and thereby open the pincers 270 to release the gripped forepart portions of the upper margin. Due to the rollers 289 being at a higher elevation than the rollers 288, the lowering of the cams 290 by the piston rods 292 will enable the lower jaws 276 to open downwardly prior to the upward opening movement of the jaws 274. Since the wipers 460, at the time of the opening of the pincers 270, are positioned above the pincers, the downward opening movement of the jaws 276 enables the pincers 270 to release the upper margin despite the inability of the jaws 274 to move upwardly at this time because of being directly beneath the wipers. As soon as the pincers release the upper margin, the motors 246 can lower them to their lowermost position.

The initial positioning of the divergent wiper surfaces 462 close to the sides of the shoe assembly by the aforementioned adjustment of the knob 446 ensures that the wipers are in engagement with the upper before the upper is released by the members 172, 186 and 270 so that there is no loss in the stretch of the upper about the last when the members 172, 186 and 270 release the upper.

The closing of the valve 638 shuts off the flow of pressurized air from the valve 638, through the pilot line 730, to the spring loaded valve 732 thereby causing this valve to shift back under its spring force to its original position, cut off the flow of pressurized air to the motor 16 through the line 736 and enable the spring in the motor 16 to lower this motor with the pressurized air in the motor venting to atmosphere through the line 736 and the valve 732. The lowering of the motor 16 causes the shoe supporting members 54, 66, 74 and 88 carried thereby to be lowered so that the shoe insole 602 is now supported solely by the wipers 460.

The aforementioned valve 744 is so constructed that it is normally open and is closed when pressurized air enters it through a pilot line 810 from a shuttle valve 812. In the idle condition of the machine and prior to the shifting of the valve 796 to actuate the wiper driving motor 430, the valve 744 is kept closed by pressurized air passing through the valve 796, the line 804, a pilot line 814, the shuttle valve 812 and the line 810. When the valve 796 is shifted, the valve 744 is kept closed by pressurized air passing through the valve 796, the line 799, the valve 800, a pilot line 816, the shuttle valve 812 and the line 810. The shifting of the valve 652 causes pressurized air to pass from the line 610 through a line 818, the valve 652 and a pilot line 820 to shift the valve 800. The shifting of the valve 800 shuts off the supply of pressurized air to the wiper driving motor 430 so that the wipers are stopped at the end of their wiping stroke in a state of equilibrium. The shifting of the valve 800 also causes the pressurized air in the line 816 to bleed through the valve 800. Since, at this time pressurized air is not entering the shuttle valve 812 through either the pilot line 814 or the pilot line 816, the valve 744 shifts to its normally open position. This causes pressurized air to pass from the line 742 through the valve 744 into a line 822. From the line 822, the pressurized air branches off into lines 824 and 826. The pressurized air in the line 824 connects to the line 760 to provide full line pressure to the motor 428 to thereby cause the motor to force the hold-down downwardly with greater pressure than had heretofore been provided through the relatively low pressure air passing through the line 754 and the regulator 756. The pressurized air in the line 826 acts to close a pressure operated electric switch 828 which is so set that it does not close under the relatively low pressure passing through the line 754.

Figure 47:
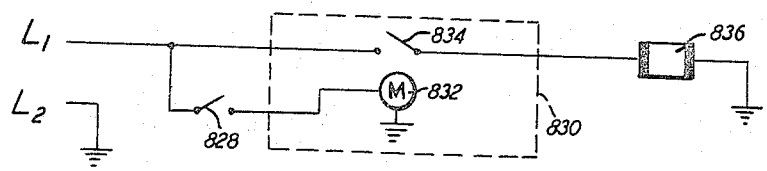
FIG. 47 is a schematic representation of a time delay mechanism used in operating the machine.

Referring to FIG. 47, the machine includes an electric control circuit that includes a source of power labelled L1, L2 and a timer 830. The timer 830 is a commercial item that includes a motor 832 that is so connected to a normally open switch 834 that the switch is caused to close a predetermined time after the motor is energized. The closing of the switch 834 energizes the solenoid 836 of the valve 710. The opening of the switch 828 deenergizes the motor 832 and causes the opening of the switch 834. The closing of the pressure actuated switch 828 therefore, after a predetermined time interval, causes the closing of the switch 834 to energize the solenoid 836 and thereby close the valve 710. The closing of the valve 710 shuts off the pressurized air to the motor 578 so that the spring in this motor may retract the piston rod 580 and plunger 582, thereby allowing the bar 552 to lower. The lowering of the bar 552 causes the valves 586 and 588 to close and return all of the machine parts to their idle condition and complete the machine cycle.

Thus, during the wiper stroke the retarders 172 and 184 and the toe support 122 move out of the way of the oncoming wipers and the side pincers 270 are opened to release the gripped forepart portions of the upper margin. These operations are so timed that the wipers engage the upper at just about the time the upper is released by the retarders and pincers so as to maintain the stretching stress that the retarders and pincers had imparted to the upper. This is aided by the fact that the yoke 492, at this time, is being forced against the shoe assembly under relatively high pressure. The wipers in crossing under the shoe assembly force the wiper supporting pins 74 and 88 inwardly. Later in the wiper stroke the shoe assembly supporting members 54, 66, 74 and 88 are lowered so that the shoe insole is supported solely by the wipers thus enabling the hold-down 408 to press the assembly downwardly directly against the wipers and provide an overwiping pressure. Towards the end of the wiper stroke the wiper driving motor is placed in a state of equilibrium to leave the wipers in the advanced and inward position they assume at the termination of the wiping stroke and the hold-down is forced downwardly under relatively high bedding pressure for a predetermined length of time to iron the now wiped lasting margin against the insole and to enable the cement 608 that is between the wiped lasting margin and insole to bond the lasting margin to the insole. At the end of this predetermined length of time, the machine parts are returned to their idle positions and the shoe is released.

To summarize, the shoe assembly is placed bottom-down on the insole rests 54, 66 and the support pins 74, 88 with the last bearing against the retarders 172, 184, the toe end of the upper margin between the open jaws of the front pincers 138 and the forepart portions of the upper margin between the open jaws of the side pincers 270. The operator now actuates the control to cause the machine to go through the pulling over portion of its cycle. This causes the front and side pincers to close on the upper margin. This is followed by a downward and rearward movement of the front pincers to stretch the toe of the upper about the last with the toe portion of the upper margin forced about the front retarder 172, a concomitant downward movement of the side pincers 270 together with a toeward and inward movement of the side pincers about their universal joint mountings 244, a concomitant raising of the heated toe support 122 against the bottom of the insole at its toe end and a concomitant lowering of the side retarders 184 thereby creating the dog ears 706 and stretching the upper margin at the toe about the front retarder blade 172.

The machine now comes to rest until the operator further actuates the control to cause the machine to go through the remainder of its cycle. This causes the slide plate 390 together with the wipers 460 and the yoke 492 to move from their out-of-the-way position to a working position and enables the hold-down 408 to bear against the shoe assembly under the influence of gravity. In response to the movement of the slide plate 390 the toe post 20 is raised to force the shoe assembly through the yoke 492, which is under relatively light pressure, and bring it to a position wherein the bottom of the insole 602 is slightly above the top of the wipers 460. During the rise of the shoe assembly the side retarders 184 rise to press the dog ears 706 against the wiper bottoms, the hold-down 408 rises with the assembly, the front pincers 138 are released from the toe portion of the upper margin and the toe portion of the upper margin is pressed against the wiper bottoms by the front retarder 172. At the end of the rise of the shoe assembly the hold-down 408 is pressed against the forepart of the shoe assembly under relatively light pressure, the heel clamp 332 is brought to bear against the heel of the shoe assembly and is locked in position and the yoke 492 is forced against the shoe assembly under relatively heavy pressure.

Now the wipers perform their wiping stroke to fold the upper margin at the toe and forepart of the shoe against the insole and adhesively bond it thereto. During the wiper stroke the knife 470 is projected forwardly of the vertex of the wipers to cut into the pleated upper material gathered by the wipers at the toe end of the shoe, the support pins 74 and 88 are forced inwardly by the wipers as they cross under the insole, the front retarder 172, the heated toe support 122 and the side retarders 184 are lowered out of the way of the advancing wipers, the side pincers 270 are opened, and the toe post 20 and the shoe support members carried thereby are lowered. At the end of the wiper stroke, the hold-down is forced downward under relatively heavy pressure to force the bottom of the shoe assembly against the upper surfaces of the wipers for a predetermined length of time after which the machine parts are disengaged from the shoe assembly.

It should be understood that the present disclosure is for the purpose of illustration only and that this invention includes all modifications and equivalents that fall within the scope of the appended claims.

Terms in the claims indicating positions and paths of movements such as "downwardly," "upwardly," and "raising" have been employed primarily to define the relative positions and paths of movements of the parts and should be construed accordingly so that organizations which have equivalent relative positions and functional relationship between the parts as are defined in the claims are considered to fall within the scope of the claims regardless of whether the parts literally have the defined positions and paths of movements.

Terms in the claims indicating relative movement of one part with respect to another part have been employed to define this relative movement regardless of which of the two parts literally moves and should be construed accordingly so that organizations which have a movement of either of the defined parts with respect to the other defined part for performing the same result are considered to fall within the scope of the claims.

While the illustrative embodiment of the invention is a machine for pulling over the toe portion of the margin of an upper and wiping it against an insole, certain facets of the invention have wider utility and therefore have not been limited in the claims to utility in such a machine.

We claim:

1. A shoe support, for supporting bottom-down a last having an upper mounted thereon and an insole located on its bottom with a lasting margin of the upper extending downwardly of the insole so that the lasting margin may be wiped against the insole, comprising: at least one upwardly facing insole rest for supporting the insole inwardly of its marginal edge; at least one upwardly facing support pin located outwardly of the insole rest for supporting the insole proximate to its marginal edge; means mounting the support pin for yieldable outward movement away from the insole rest; and means limiting the extend of such outward movement.

2. The shoe support according to claim 1 further comprising: means mounting the support pin for yieldable upward movement to thereby cause the support pin to yieldable press the margin of the insole against the bottom of the last.

3. A shoe support, for supporting bottom-down a last having an upper mounted thereon and an insole located on its bottom with a lasting margin of the upper extending downwardly of the insole so that the lasting margin may be wiped against the insole, comprising: a platform; an upwardly facing insole rest on the platform; a platform extension slidably mounted on the platform for movement toward and away from the insole rest; means for locking the platform extension in position; a leaf movably mounted on the platform extension for heightwise movement; at least one upwardly facing insole rest on the leaf; and means for adjustably limiting the extent of downward movement of the leaf.

4. A shoe support, for supporting bottom-down a last having an upper mounted thereon and an insole located on its bottom with a lasting margin of the upper extending downwardly of the insole so that the lasting margin may be wiper against the insole, comprising: a platform; an upwardly facing insole rest on the platform; gibs on the platform extending forwardly of the insole rest; a platform extension slidably mounted in the gibs; means for locking the platform extension in place in the gibs; a leaf pivoted to the platform extension for heightwise movement; at least one upwardly facing insole rest on the leaf; and a stop member extending upwardly of the platform extension and bearing against the underside of the leaf.

5. The shoe support according to claim 4 further comprising: means mounting the stop member in the platform extension for heightwise movement with respect to the platform extension.

6. A shoe support, for supporting bottom-down a last having an upper mounted thereon and an insole located on its bottom with a lasting margin of the upper extending downwardly of the insole so that the lasting margin may be wiped against the insole, comprising: a platform; an upwardly facing insole rest on the platform; a leaf located forwardly of the insole rest; means mounting the leaf for heightwise movement; at least one upwardly facing insole rest on the leaf; and means for limiting the extent of downward movement of the leaf.

7. A shoe support, for supporting bottom-down a last having an upper mounted thereon and an insole located on its bottom with a lasting margin of the upper extending downwardly of the insole so that the lasting margin may be wiped against the insole, comprising: a platform; an upwardly facing insole rest on the platform; a platform extension located forwardly of the platform; a leaf pivoted to the platform extension for heightwise movement; at least one upwardly facing insole rest on the leaf; and a stop member extending upwardly of the platform extension and bearing against the underside of the leaf.

8. The shoe support according to claim 7 further comprising: means mounting the stop member in the platform extension for heightwise movement with respect to the platform extension.

9. A shoe support, for supporting bottom-down a last having an upper mounted thereon and an insole located on its bottom with a lasting margin of the upper extending downwardly of the insole so that the lasting margin may be wiped against the insole, comprising: a platform; an upwardly facing insole rest on the platform; a finger on each side of the insole rest that is pivoted to the platform for inward and outward swinging movement, said fingers being so constructed as to be yieldably urged upwardly; a support pin on each finger; means for yieldably urging the fingers outwardly with respect to the platform; and means for limiting the extent of outward movement of the fingers.

10. A shoe support, for supporting bottom-down a last having an upper mounted thereon and an insole located on its bottom with a lasting margin of the upper extending downwardly of the insole so that the lasting margin may be wiped against the insole, comprising: a platform; an upwardly facing insole rest on the platform; a fulcrum located on the platform forwardly of the insole rest on each side of the longitudinal center line of the platform; a finger pivoted on each fulcrum for inward and outward swinging movement, the end of each finger extending rearwardly of its fulcrum being constructed as an upwardly biased leaf spring; a support pin extending upwardly of each leaf spring; spring means connected to the forward end of each finger for yieldably urging the leaf springs outwardly; and stop means for limiting the extent of outward movement of the leaf springs.

11. The shoe support according to claim 10 wherein the spring means comprises a tension spring extending between the forward ends of the fingers and the stops means comprises a stop member in the forward end of each finger positioned to abut against the platform.

12. A shoe end lasting machine, for wiping the lasting margin of an end of a shoe upper against the corresponding end of a shoe insole, comprising: an insole rest having an upwardly facing surface for supporting bottom-down a last having said upper mounted thereon and said insole located on its bottom with the lasting margin of the upper extending downwardly of the insole at said end, said insole having a ribbon of cement deposited on said end proximate to its margin; wiping means located rearwardly of the insole rest mounted to move from a retracted to an advanced position to engage said end of the lasting margin and wipe it forwardly and inwardly against the insole to bond the lasting margin to the insole by way of the cement; means initially locating the wiping means in its retracted position; a shoe end support positioned between the insole rest and the wiping means in its retracted position for supporting said insole at said end in the region having the deposit of cement thereon; means mounting the shoe end support for the heightwise movement with respect to the insole rest; means for initially positioning the shoe end support below the level of the insole rest; means for thereafter raising the shoe end support with respect to the insole rest so that the shoe end support may be brought to bear against said region of the insole after the insole has been placed on the insole rest and prior to the wiping of the lasting margin by the wiping means; and means for thereafter moving the wiping means from its retracted to its advanced position.

13. The machine as defined in claim 12 further comprising: means for heating the shoe end support.

14. The machine as defined in claim 12 further comprising: means for lowering the shoe end support to its initial position after the wiping means has commenced its movement.

15. A method of lasting an end of a shoe, by wiping the lasting margin of an end of a shoe upper against the corresponding end of a shoe insole, comprising: providing a shoe assembly comprising a last having an upper mounted thereon and an insole located on its bottom; depositing a ribbon of heat-softenable cement on said insole proximate to its margin; supporting the shoe assembly bottom-down on an insole rest with the insole rest bearing against a portion of the insole that does not have the cement thereon; thereafter moving a shoe end support against the insole proximate to said end of the insole in the region of the insole having the deposit of cement thereon; and thereafter wiping the lasting margin of the upper at said end against said end of the insole to bond the lasting margin to the insole by way of the cement.

16. The method as defined in claim 15 further comprising: applying heat to the shoe end support.

17. The method as defined in claim 15, wherein the wiping is effected by moving wiping means against the lasting margin at said end and under the insole, and further comprising: moving the shoe end support away from the insole after the wiping means has moved under the insole.

18. A shoe end lasting machine, for wiping the lasting margin of an end of a shoe upper against the corresponding end of a shoe insole, comprising: a post; an insole rest mounted on said post for supporting bottom-down a last having said upper mounted thereon and said insole located on its bottom with the lasting margin of the upper extending downwardly of the insole at said end, said insole having a ribbon of heat-softenable cement deposited on said end proximate to its margin; wiping means located rearwardly of the insole rest mounted to move from a retracted to an advanced position to engage said end of the lasting margin and wipe it forwardly and inwardly against the insole to bond the lasting margin to the insole by way of the cement; means initially maintaining the wiping means in its retracted position; a slide movably mounted in the post for heightwise movement; a shoe end support, made of heat conductive material, connected to the slide for movement therewith and positioned between the insole rest and the wiping means in its retracted position, for supporting said insole at said end in the region having the deposit of cement thereon; means for heating the shoe end support; means for initially positioning the slide so that the shoe end support is below the level of the insole rest; means for thereafter raising the slide to bring the shoe end support to bear against said region of the insole after the insole has been placed on the insole rest and prior to the wiping of the lasting margin by the wiping means; means for thereafter moving the wiping means from its retracted to its advanced position; and means for lowering the slide to lower the shoe end support after the wiping means has commenced its movement.

19. A shoe end lasting machine, for wiping the lasting margin of an end of a shoe upper against the corresponding end of a shoe insole, comprising: a post; an insole rest mounted on said post for supporting bottom-down a last having said upper mounted thereon and said insole located on its bottom with the lasting margin of the upper extending downwardly of the insole at said end, said insole having a ribbon of heat-softenable cement deposited on said end proximate to its margin; wiping means located rearwardly of the insole rest mounted to move from a retracted to an advanced position to engage said end of the lasting margin and wipe it forwardly and inwardly against the insole to bond the lasting margin to the insole by way of the cement; a slide movably mounted in the post for heightwise movement; a shoe end support, made of heat conductive material, connected to the slide for movement therewith and positioned between the insole rest and the wiping means in its retracted position, for supporting said insole at said end in the region having the deposit of cement thereon; means for heating the shoe end support; a motor mounted on the post and operatively connected to the slide to effect its heightwise movement; and control means connected to the wiping means and the motor operative to initially maintain the wiping means in its retracted position and the slide in a lower position so that the shoe end support is below the level of the insole rest, thereafter raise the slide to bring the shoe end support to bear against said region of the insole after the insole has been placed on the insole rest and prior to the wiping of the lasting margin by the wiping means, thereafter moves the wiping means from its retracted to its advanced position, and lower the slide to lower the shoe end support after the wiping means has commenced its movement.

20. A shoe support, for supporting bottom-down a last having an upper mounted thereon and an insole located on its bottom so that an end of the margin of the upper may be wiped against the corresponding end of the insole and bonded to the insole by way of a ribbon of cement deposited on said end of the insole proximate to its margin, comprising: an insole rest adapted to bear against and support said insole; a shoe end support positioned adjacent the insole rest for supporting said insole at said end in the region having the deposit of cement thereon; means mounting the shoe end support for height-wise movement with respect to the insole rest; means for initially positioning the shoe end support below the level of the insole rest; and means for thereafter raising the shoe end support with respect to the insole rest so that the shoe end support may be brought to bear against said region of the insole after the insole has been placed on the insole rest.

21. The support as defined in claim 20 further comprising: means for heating the shoe end support.

22. A shoe support, for supporting bottom-down a last having an upper mounted thereon and an insole located on its bottom so that an end of the margin of the upper may be wiped against the corresponding end of the insole and bonded to the insole by way of a ribbon of heat-softenable cement deposited on said insole proximate to its margin, comprising: a post; an insole rest mounted on said post adapted to bear against and support said insole; a slide movably mounted in the post for heightwise movement; a shoe end support, made of heat conductive material, connected to the slide for movement therewith and positioned adjacent the insole rest for supporting said insole at said end in the region having the deposit of cement thereon; means for heating the shoe end support; means for initially positioning the slide so that the shoe end support is below the level of the insole rest; and means for thereafter raising the slide to bring the shoe end support to bear against said region of the insole after the insole has been placed on the insole rest.

23. A shoe support, for supporting bottom-down a last having an upper mounted thereon and an insole located on its bottom so that an end of the margin of the upper may be wiped against the corresponding end of the insole and bonded to the insole by way of a ribbon of heat-softenable cement deposited on said insole proximate to its margin, comprising: a post; an insole rest mounted on said post adapted to bear against and support said insole; a slide movably mounted in the post for heightwise movement; a shoe end support, made of heat conductive material, connected to the slide for movement therewith and positioned adjacent the insole rest for supporting said insole at said end in the region having the deposit of cement thereon; means for heating the shoe end support; a motor mounted on the post and operatively connected to the slide to effect its heightwise movement; and control means connected to the motor operative to initially maintain the slide in a lower position so that the shoe end support is below the level of the insole rest and thereafter raise the slide to bring the shoe end support to bear against said region of the insole after the insole has been placed on the insole rest.

24. A toe pulling over and lasting machine comprising: wiping means mounted for forward movement; a shoe support positioned adjacent the wiping means for supporting bottom-down a shoe assembly that includes a last having an upper draped about its toe and an insole positioned on its bottom; means mounting the shoe support for heightwise movement; a retarder located on each side of the shoe support; a front gripping means located rearwardly of the shoe support and of the retarders for gripping the toe end portion of the upper margin; a side gripping means located at each side of the shoe support and forwardly of the retarders for gripping the forepart portions of the upper margin; means mounting the retarders and each of the gripping means for heightwise movement relative to the shoe support; means for initially placing the shoe support in a position wherein the bottom of the insole is below the top of the wiping means, wherein the retarders are in an elevated position with respect to the shoe support so that they are located above the shoe support and wherein all of the gripping means are in an elevated position with respect to the shoe support, whereby the shoe assembly may be placed bottom-down on the shoe support and positioned against the retarders; means for causing each of said gripping means to grip the aforesaid portions of the upper margin and for lowering each of said gripping means with respect to the shoe support to stretch the said portions of the upper about the last and create dog ears between the gripped portions that extend outwardly of the last; means for lowering the retarders below the level of the shoe support prior to the creation of the dog ears by the lowering of the gripping means; means for raising the shoe support at least an amount sufficient to bring the bottom of the insole to the level of the top of the wiping means; means for maintaining the aforesaid portions of the upper stretched about the last during the rise of the shoe support; means for applying a yieldable upwardly directed force to each of the retarders during the rise of the shoe support to cause the retarders to press the dog ears against the bottom of the wiping means; and means operative after the rise of the shoe support for moving the wiping means forwardly across the bottom of the insole to wipe the upper margin against the insole.

25. A toe pulling over and lasting machine comprising: wiping means mounted for forward movement; a shoe support positioned adjacent the wiping means for supporting bottom-down a shoe assembly that includes a last having an upper draped about its toe and an insole positioned on its bottom; means mounting the shoe support for heightwise movement; a side retarder located on each side of the shoe support; a front gripping means located rearwardly of the shoe support and of the side retarders for gripping the toe end portion of the upper margin; a front retarder located forwardly of the front gripping means and rearwardly of the side retarders and shoe support; a side gripping means located at each side of the shoe support and forwardly of the side retarders for gripping the forepart portions of the upper margin; means mounting each of the retarders and each of the gripping means for heightwise movement in unison with the shoe support; resilient means yieldably urging the front retarder upwardly with respect to the shoe support to a level above the shoe support; means for enabling the side retarders and each of the gripping means to be moved heightwise with respect to the shoe support; means for initially placing the shoe support in a position wherein the bottom of the insole is below the top of the wiping means, wherein the side retarders are in an elevated position with respect to the shoe support so that they are located above the shoe support and wherein all of the gripping means are in an elevated position with respect to the shoe support, whereby the shoe assembly may be placed bottom-down on the shoe support and positioned against the retarders; means for causing each of said gripping means to grip the aforesaid portions of the upper margin and for lowering each of said gripping means with respect to the shoe support to stretch said portions of the upper about the last, create dog ears between the gripped portions that extend outwardly of the last and cause the toe portion of the upper margin to press the front retarder downwardly against the pressure of the resilient means; means for lowering the side retarders below the level of the shoe support prior to the creation of the dog ears by the lowering of the gripping means; means for raising the shoe support at least an amount sufficient to bring the bottom of the insole to the level of the top of the wiping means; means for causing the front gripping means to release the toe end portion of the upper margin during the rise of the shoe support whereby the resilient means causes the front retarder to press the toe end portion of the upper margin against the bottom of the wiping means; means for applying a yieldable upwardly directed force to each of the side retarders during the rise of the shoe support to cause the side retarders to press the dog ears against the bottom of the wiping means; means enabling the side gripping means to maintain the forepart portion of the upper stretched about the last during the rise of the shoe support; and means operative after the rise of the shoe support for moving the wiping means forwardly across the bottom of the insole to wipe the upper margin against the insole.

26. The machine as defined in claim 25 further comprising: means operative after the wiping means has commenced its forward movement to cause the front and side retarders to be lowered with respect to the shoe support and away from the wiping means.

27. The machine as defined in claim 26 further comprising: means operative after the wiping means has commenced its forward movement to cause the side gripping means to release the forepart portions of the upper margin.

28. The machine as defined in claim 27 further comprising: means operative after the wiping means has commenced its forward movement and has passed under the bottom of the insole to lower the shoe support.

29. A toe pulling over and lasting machine comprising: wiping means mounted for forward movement; a post mounted for heightwise movement; a shoe support located on the post for supporting bottom-down a shoe assembly that includes a last having an upper draped about its toe and an insole positioned on its bottom; a ledge connected to the post for heightwise movement therewith; a side retarder mounted on the ledge on each side of the shoe support for heightwise movement with respect to the ledge; a housing secured to the ledge rearwardly of the shoe support; a front pincers, comprising a pair of relatively movable jaws, movably mounted in the housing for heightwise movement; a front retarder mounted in the housing forwardly of the front pincers for heightwise movement; resilient means yieldably urging the front retarder upwardly with respect to the housing to a level above the shoe support; a base connected to the post for heightwise movement therewith; a side pincers, comprising a pair of relatively movable jaws, mounted on the base for heightwise movement, said side pincers being located on each side of the shoe support and forwardly of the side retarders; means for initially placing the post in a position wherein the shoe support is so located that the bottom of the insole is below the top of the wiping means, wherein the side retarders are in an elevated position with respect to the ledge so that they are located above the shoe support, wherein the front pincers are in an elevated position with respect to the housing with the front pincers jaws open and wherein the side pincers are in an elevated position with respect to the base with the side pincers jaws open, whereby the shoe assembly may be placed bottom-down on the shoe support and positioned against the retarders; means for closing each of the pincers jaws thereby causing the front pincers to grip the toe end portion of the upper margin and the side pincers to grip the forepart portions of the upper margin; means for thereafter lowering the front pincers with respect to the housing and the side pincers with respect to the base to stretch said portions of the upper about the last, create dog ears between the gripped portions that extend outwardly of the last and cause the toe portion of the upper margin to press the front retarder downwardly against the pressure of the resilient means; means for thereafter raising the post, together with the shoe support, ledge, housing and base, at least an amount sufficient to bring the bottom of the insole to the level of the top of the wiping means; means for opening the front pincers jaws during the rise of the post to enable them to release the toe end portion of the upper margin, whereby the resilient means causes the front retarder to press said toe end portion against the bottom of the wiping means; means for applying a yieldable upwardly directed force to each of the side retarders with respect to the ledge during the rise of the post to cause the side retarders to press the dog ears against the bottom of the wiping means; means enabling the side pincers to retain their relative position with respect to the base during the rise of the post to maintain the forepart portions of the upper stretched about the last during the rise of the shoe support; and means operative after the post has completed its rise for moving the wiping means forwardly across the bottom of the insole to wipe the upper margin against the insole.

30. The machine as defined in claim 29 further comprising: means for lowering the side retarders with respect to the ledge prior to the creation of the dog ears by the lowering of the front and side pincers.

31. The machine as defined in claim 29 further comprising: means operative after the wiping means has commenced its forward movement to cause the front and side retarders to be lowered away from the wiping means.

32. The machine as defined in claim 31 further comprising: means operative after the wiping means has commenced its forward movement to cause the side pincers jaws to open to thereby release the forepart portions of the upper margin.

33. The machine as defined in claim 32 further comprising: means operative after the wiping means has commenced its forward movement and has passed under the bottom of the insole to lower the post.

34. A method of pulling over the toe of a shoe upper and lasting the toe of the upper, by wiping the margin of the toe of the upper forwardly and inwardly against a shoe insole, comprising the steps of: providing wiping means; providing a shoe support for supporting bottom-down a shoe assembly that includes a last having an upper draped about its toe and an insole positoned on its bottom; locating a retarder on each side of the shoe support at a level that is higher than the shoe support; placing the shoe assembly bottom on the shoe support and positioning the last against the retarders with the bottom of the insole located below the top of the wiping means; gripping the toe end portion of the upper margin rearwardly of the area of engagement of the retarders with the last; gripping the forepart portions of the upper margin forwardly of the area of engagement of the retarders with the last; pulling the gripped portions of the margin downwardly to stretch the said portions of the upper about the last and create dog ears between the gripped portions that extend outwardly of the last; lowering the retarders below the level of the shoe support prior to the creation of the dog ears by the downward pulling of the gripped portions of the upper margin; raising the shoe support to raise the shoe assembly at least an amount sufficient to bring the bottom of the insole to the level of the top of the wiping means while maintaining the said toe end and forepart portions gripped and pulled; applying yieldable upwardly directed forces by the retarders during the rise of the shoe assembly thereby pressing the dog ears against the bottom of the wiping means; and moving the wiping means forwardly across the bottom of the insole, after the shoe assembly has completed its rise, to wipe the upper margin against the insole.

35. A method of pulling over the toe of a shoe upper and lasting the toe of the upper, by wiping the margin of toe of the upper forwardly and inwardly against a shoe insole, comprising the steps of: providing wiping means; providing a shoe support for supporting bottom-down a shoe assembly that includes a last having an upper draped about its toe and an insole positioned on its bottom; locating a side retarder on each side of the shoe support at a level that is higher than the shoe support; locating a front retarder rearwardly of the shoe support and side retarders that are yieldably urged upwardly with respect to the shoe support to a level above the shoe support; placing the shoe assembly bottom on the shoe support and positioning the last against the side and front retarders with the bottom of the insole located below the top of the wiping means; gripping the toe end portion of the upper margin rearwardly of the area of engagement of the front retarder with the last; gripping the forepart portions of the upper margin intermediate the areas of engagement of the front and side retarders with the last; pulling the gripped portions of the margin downwardly to stretch the said portions of the upper about the last and create dog ears between the gripped portions that extend outwardly of the last; lowering the side retarders below the level of the shoe support prior to the creation of the dog ears by the downward pulling of the gripped portions of the upper margin; raising the shoe support to raise the shoe assembly at least an amount sufficient to bring the bottom of the insole to the level of the top of the wiping means; releasing the gripped toe end portion of the upper margin during the rise of the shoe assembly whereby the toe end portion of the upper margin is yieldably pressed against the bottom of the wiping means; applying yieldable upwardly directed forces by the retarders during the rise of the shoe assembly thereby pressing the dog ears against the bottom of the wiping means; maintaining the forepart portions of the upper margin gripped and pulled during the rise of the shoe assembly; and moving the wiping means forwardly across the bottom of the insole, after the shoe assembly has completed its rise, to wipe the upper margin against the insole.

36. The method as defined in claim 35 further comprising: lowering the front and side retarders with respect to the shoe support and away from the wiping means after the wiping means has commenced its forward movement.

37. The method as defined in claim 36 further comprising: lowering the shoe support after the wiping means has commenced its forward movement and has passed under the bottom of the insole.

38. A pulling over mechanism, for pulling over the toe of a shoe upper preparatory to wiping the margin of the toe of the upper forwardly and inwardly against a shoe insole, comprising: support means for supporting bottom-down a shoe assembly that includes a last having an upper draped about its toe with the bottom of the assembly substantially lying in a predetermined plane; a front pincers, located rearwardly of the support means, mounted for movement in a downward and rearward direction with respect to said plane, said front pincers and its mounting comprising a housing, a forwardly and downwardly extending guideway in the housing, a first bar slidably mounted in the guideway, a first pincers jaw at the upper end of the first bar, a second bar slidably mounted on the first bar for movement toward and away from the first pincers jaw, and a second pincers jaw on the upper end of the second bar; a side pincers carrier located forwardly of the front pincers on each side of the support means; means mounting each side pincers carrier to permit it to move rearwardly and inwardly; means yieldably locating each side pincers carrier in an outward and forward position; a side pincers mounted in each side pincers carrier for heightwise movement; powered means operative to move the second bar with respect to the first bar to thereby actuate the front pincers to grip the toe end portion of the upper margin; means for actuating the side pincers to grip the forepart portions of the upper margin; powered means actuable to move the first and second bars in unison along the guideway; and means for concomitantly actuating the latter powered means to thereby cause the front pincers to move in said direction and for moving the side pincers downwardly in the pincers carriers.

39. The mechanism as defined in claim 38 wherein said first powered means comprises a first motor secured to the housing and connected to the first bar for effecting said movement of the first bar; and wherein said second powered means comprises a second motor secured to the first bar and connected to the second bar for effecting said movement of the second bar.

40. A pulling over mechanism, for pulling over toe toe of a shoe upper preparatory to wiping the margin of the toe of the upper forwardly and inwardly against a shoe insole, comprising: support means for supporting bottom-down a shoe assembly that includes a last having an upper draped about its toe with the bottom of the assembly substantially lying in a predetermined plane; a front pincers located rearwardly of the support means; means mounting the front pincers for movement in a downward and rearward direction with respect to said plane; a first motor, located forwardly of the front pincers on each side of the support means, mounted for universal movement to permit it to move rearwardly and inwardly; means yieldably locating each of the first motors in an outward and forward position; a second motor mounted on each first motor for heightwise movement; means operative in response to actuation of the first motors to effect heightwise movement of the second motors; a side pincers that comprises a pair of pincers jaws mounted on each second motor for movement toward and away from each other; means responsive to actuation of the second motors to effect said movements of the pincers jaws; means for actuating the front pincers to grip the toe end portion of the upper margin; means for actuating the second motors to move said pincers jaws toward each other to thereby cause the side pincers to grip the forepart portions of the upper margin; and means for concomitantly causing the front pincers to move in said direction and for actuating the first motors to move the second motors downwardly to thereby move the side pincers downwardly in the first motors.

41. A pulling over mechanism, for pulling over the toe of a shoe upper preparatory to wiping the margin of the toe of the upper forwardly and inwardly against a shoe insole, comprising: support means for supporting bottom-down a shoe assembly that includes a last having an upper draped about its toe with the bottom of the assembly substantially lying in a predetermined inclined plane that extends downwardly and forwardly; a pin on each side of the support means having an axis that extends upwardly and forwardly in a direction that is substantially normal to said predetermined plane; a carrier mounted on each pin for universal movement; a first stop means for limiting the extent that each carrier may move downwardly and forwardly on said pin under the influence of gravity; spring means for yieldably urging each carrier outwardly; second stop means for limiting the extent that each carrier may move outwardly under the influence of the spring means; a side pincers mounted in each carrier for heightwise movement; means for actuating the side pincers to cause them to grip the forepart portions of the upper margin; a front pincers located rearwardly of the support means and carriers; means for actuating the front pincers to cause them to grip the toe end portion of the upper margin; and means for concomitantly moving the front pincers downwardly and rearwardly with respect to said inclined plane and moving the side pincers downwardly in the carriers.

42. The machine as claimed in claim 41 further comprising: a base; means mounting said pins in the base; a stop plate connected to each pin; and wherein said first stop means comprises a stop member on the bottom of each carrier adapted to bear against its associated stop plate.

43. The machine as claimed in claim 41 further comprising: a base; means mounting said pins in the base; said second stop means is consituted by a cam mounted on the base; and said spring means is constituted by a spring extending from the base to the carrier to resiliently urge the carrier against the cam.

44. A pulling over mechanism, for pulling over the toe of a shoe upper preparatory to wiping the margin of the toe of the upper forwardly and inwardly against a shoe insole, comprising: support means for supporting bottom-down a shoe assembly that includes a last having an upper draped about its toe with the bottom of the assembly substantially lying in a predetermined inclined plane that extends downwardly and forwardly; a base lying in a plane that is substantially parallel to said predetermined plane; a pin mounted in the base on each side of the support means, each pin being disposed on an axis that extends upwardly and forwardly in a direction that is substantially normal to said predetermined plane; a universal joint at the upper end of each pin; a carrier mounted on each universal joint; a stop plate connected to each pin above the base; a lug projecting downward of each carrier forwardly of its associated stop plate; a stop member in each lug adapted to bear against its associated stop plate; a cam mounted in each stop plate outwardly of its associated pin; a spring extending from each carrier to the base so constructed as to resiliently urge the carriers against the cams; a side pincers mounted in each carrier for heightwise movement; means for actuating the side pincers to cause them to grip the forepart portions of the upper margin; a front pincers located rearwardly of the support means and carriers; means for actuating the front pincers to cause them to grip the toe end portion of the upper margin; and means for concomitantly moving the front pincers downwardly and rearwardly with respect to said inclined plane and moving the side pincers downwardly in the carriers.

45. The mechanism as claimed in claim 44 further comprising: means for adjusting the pins forwardly and rearwardly in the base.

46. The mechanism as claimed in claim 44 further comprising: means for angularly adjusting each pin about its axis.

47. A method of pulling over the toe of a shoe upper preparatory to wiping the margin of the toe of the upper forwardly and inwardly against a shoe insole comprising: supporting bottom-down a shoe assembly that includes a last having an upper draped about its toe with the bottom of the assembly substantially lying in a predetermined plane; gripping the toe end portion of the upper margin; gripping the forepart portions of the upper margin by pincers that are normally in a forward and outward position but are capable of being moved rearwardly and inwardly; exerting a pulling stress on the gripped toe end portion in a direction that is downward and rearward with respect to said predetermined plane and concomitantly exerting a downward pulling stress by said pincers on said forepart portions; and causing the pincers together with the gripped forepart portions to be moved inwardly and rearwardly solely by the displacement of the gripped forepart portions pursuant to the exertion of the pulling stress on said gripped toe end portion.

48. A toe pulling over and lasting machine, for stretching the toe of a shoe upper about a last and wiping the margin of the toe of the upper against a shoe insole, comprising: wiping means mounted for forward movement from a retracted to an advanced position; a post mounted for heightwise movement; a shoe support located on the post forwardly of the wiping means in its retracted position for supporting bottom-down a shoe assembly that includes the last having the upper draped about its toe and the insole located on its bottom; a housing secured to the post rearwardly of the shoe support; a guideway in the housing that extends in a direction that is downward and rearward with respect to the shoe support; a pincers, comprising a pair of relatively movable jaws, movably mounted in a guideway; a retarder mounted in the housing, below the wiping means and forwardly of the guideway, for heightwise movement: resilient means yieldably urging the retarder upwardly with respect to the housing to a level above the shoe support; means for initially placing the post in a position wherein the shoe support is so located that the bottom of the insole is below the top of the wiping means; means for initially placing the pincers in an elevated and forward position with respect to the shoe support with the pincers jaws open; means for closing the pincers jaws to thereby cause them to grip the toe end portion of the upper margin; means for thereafter moving the pincers downwardly and rearwardly in the guideway to stretch the toe to the upper about the last; means for thereafter raising the post, together with the shoe support and housing, at least an amount sufficient to bring the bottom of the insole to the level of the top of the wiping means; means for opening the pincers jaws during the rise of the post to enable them to release the toe end portion of the upper margin, whereby the resilient means causes the retarder to press said upper margin portion against the bottom of the wiping means; and means operative after the post has completed its rise for moving the wiping means forwardly across the bottom of the insole to wipe the margin of the toe of the upper against the insole.

49. The machine as defined in claim 48 whereby said pincers and its moving means comprises: a first bar slidably mounted in the guideway; a first pincers jaw at the upper end of the first bar; a second bar slidably mounted on the first bar for movement toward and away from the first pincers jaw; a second pincers jaw at the upper end of the second bar; first powered means operative to move the first and second bars in unison along the guideway; and second powered means operative to move the second bar with respect to the first bar.

50. The machine as defined in claim 49 wherein said first powered means comprises a first motor secured to the housing and connected to the first bar for effecting said movement of the first bar; and wherein said second powered means comprises a second motor secured to the first bar and connected to the second bar for effecting said movement of the second bar.

51. The machine as defined in claim 48 further comprising: means operative after the wiping means has commenced its forward movement to cause said retarder to be lowered away from the wiping means.

52. A toe pulling over and lasting machine, for stretching the toe of a shoe upper about a last and wiping the margin of the toe of the upper against a shoe insole, comprising: wiping means mounted for forward movement from a retracted to an advanced position; a post mounted for heightwise movement; a shoe support located on the post forwardly of the wiping means in its retracted position for supporting bottom-down a shoe assembly that includes the last having the upper draped about its toe and the insole located on its bottom; a housing secured to the post rearwardly of the shoe support; a first guideway in the housing that extends in a direction that is downward and rearward with respect to the shoe support; a pincers, comprising a pair of relatively movable jaws, movably mounted in the first guideway; a second, heightwise extending, guideway in the housing located forwardly of the first guideway; a bar slidably mounted in the second guideway; a retarder at the top of the bar positioned below the wiping means and forwardly of the first guideway; a cylinder; a piston mounted for reciprocating movement in the cylinder in a first and a second direction; means connecting the piston to the bar whereby movement of the piston in the first direction raises the bar and movement of the piston in the second direction lowers the bar; a spring bearing against the piston to yieldably urge it in the second direction; means connecting the cylinder to a source of compressible fluid under pressure to enable the fluid to force the piston in the first direction against the force of the spring whereby the retarder is yieldably urged upwardly with respect to the housing to a level above the shoe support; means for initially placing the post in a position wherein the shoe support is so located that the bottom of the insole is below the top of the wiping means; means for initially placing the pincers in an elevated and forward position with respect to the shoe support with the pincers jaws open; means for closing the pincers jaws to thereby cause them to grip the toe end portion of the upper margin; means for thereafter moving the pincers downwardly and rearwardly in the guideway to stretch the toe of the upper about the last; means for thereafter raising the post, together with the shoe support and housing, at least an amount sufficient to bring the bottom of the insole to the level of the top of the wiping means; means for opening the pincers jaws during the rise of the post to enable them to release the toe end portion of the upper margin, whereby the fluid causes the retarder to press said upper margin portion against the bottom of the wiping means; means operative after the post has completed its rise for moving the wiping means forwardly across the bottom of the insole to wipe the margin of the toe of the upper against the insole; and means operative after the wiping means has commenced its forward movement to cut off the supply of fluid to the cylinder thereby enabling the spring to force the piston in the second direction to lower the retarder away from the wiping means.

53. A pulling over and lasting machine, for stretching a selected portion of a shoe upper about a last and wiping the margin of said upper portion against the corresponding portion of a shoe insole, comprising: wiping means mounted for inward movement in a predetermined plane from a retracted to an advanced position; support means for supporting bottom-down a shoe assembly that includes the last having said upper portion draped thereon and the insole located on its bottom; a pincers, mounted for heightwise movement and located adjacent said margin, having an upper jaw and a lower jaw; means mounting said jaws for swinging movement toward and away from each other; spring means connected to each jaw for yieldably urging each jaw away from the other jaw; a leg extending downwardly of each jaw with the upper jaw leg extending below the lower jaw leg; a cam located below the legs and mounted for movement toward and away from the legs; means for moving the cam upwardly to cause the cam to engage the legs and thereby move each of said jaws toward the other jaw to close the pincers on the margin; means for urging the pincers downwardly to a position wherein the upper jaw is below said predetermined plane; means for moving the wiping means inwardly across the bottom of the insole to wipe said margin against the insole; and means operative during the movement of the wiping means to move the cam downwardly whereby the lower jaw is moved away from the upper jaw under the influence of its associated spring means before the upper jaw is enabled to move away from the lower jaw under the influence of its associated spring means so that the margin is released from the jaws despite the proximity of the upper jaw to the bottom of the wiping means.

54. A shoe lasting machine, for conforming a selected portion of a shoe upper to the shape of the corresponding portion of a last and wiping the margin of said upper portion against the corresponding portion of a shoe insole, comprising: wiping means mounted for inward movement from a retracted to an advanced position; a shoe support, mounted for heightwise movement, for supporting bottom-down a shoe assembly that includes the last having said upper portion draped thereon and the insole located on its bottom; a shoe conforming pad positioned above the wiping means and outwardly of the shoe support; means for initially positioning the shoe support so that the insole is below the top of the wiping means; means for initially yieldably urging the pad inwardly against said last portion under relatively light pressure; means for raising the shoe support at least an amount sufficient to bring the insole bottom to the level of the top of the wiping means whereby the pad snugly conforms said upper portion to the shape of said last portion; means operative subsequent to the rise of the shoe support to yieldably urge the pad inwardly against said last portion under relatively heavy pressure to clamp said upper portion against said last portion; and means for thereafter advancing the wiping means inwardly from its retracted position across the bottom of the insole to wipe said margin agaist the insole.

55. A toe lasting machine, for conforming the toe of a shoe upper to the shape of the toe of a last and wiping the margin of the toe of the upper against a shoe insole, comprising: wiping means mounted for forward movement from a retracted to an advanced position; a shoe support, mounted for heightwise movement, for supporting bottom-down a shoe assembly that includes the last having the upper draped about its toe and the insole located on its bottom; a shoe conforming yoke, positioned above the wiping means and outwardly of the shoe support, having a bight and a pair of legs extending forwardly and divergently of the bight; means for initially positioning the shoe support so that the insole is below the top of the wiping means; means for initially yieldably urging the yoke legs inwardly against the last under relatively light pressure; means for raising the shoe support at least an amount sufficient to bring the insole bottom to the level of the top of the wiping means whereby the yoke snugly conforms the toe of the upper to the shape of the toe of the last; means operative subsequent to the rise of the shoe support to yieldably urge the yoke legs inwardly against the last under relatively heavy pressure to clamp the toe of the upper against the last; and means for thereafter advancing the wiping means forwardly from its retracted position across the bottom of the insole to wipe the margin of the toe of the upper against the insole.

56. A toe lasting machine, for conforming the toe of a shoe upper to the shape of the toe of a last and wiping the margin of the toe of the upper against a shoe insole, comprising: wiping means mounted for forward movement from a retracted to an advanced position; a shoe support, mounted for heightwise movement, for supporting bottom-down a shoe assembly that includes the last having the upper draped about its toe and the insole located on its bottom; a shoe conforming yoke, positioned above the wiping means and outwardly of the shoe support, having a bight and a pair of legs extending forwardly and divergently of the bight; a fluid actuated motor comprising a piston member and a cylinder member positioned outwardly of each leg; means mounting a first one of said members of each motor for inward movement with respect to the second of said members of each motor in response to the application of fluid under pressure between said members; means connecting each of said first members to a yoke leg; means for initially positioning the shoe support so that the insole is below the top of the wiping means; means for initially supplying fluid under relatively light pressure between said members; means for raising the shoe support at least an amount sufficient to bring the insole bottom to the level of the top of the wiping means whereby the yoke snugly conforms the toe of the upper to the shape of the toe of the last; means operative subsequent to the rise of the shoe support to supply fluid under relatively heavy pressure between said members to cause the yoke legs to clamp the toe of the upper against the last; and means for thereafter advancing the wiping means forwardly from its retracted position across the bottom of the insole to wipe the margin of the toe of the upper against the insole.

57. A shoe conformer comprising: a yoke having a bight and a leg on each side of the bight extending away from the bight, said yoke being adapted to receive a last mounted shoe upper interiorly thereof; a block located outwardly of each yoke leg; a fluid actuated motor comprising a piston member and a cylinder member associated with each yoke leg; means pivotally connecting a first member of each motor to each block to extend inwardly thereof for swinging movement about an axis transverse to the yoke; means mounting the second member of each motor for inward movement with respect to its associated first member in response to the application of fluid under pressure between said members; a flange located inwardly of each of said second members, each flange being so located as to be abutted by its associated second member upon inward movement of the second member; an opening in each flange; a rod connected to each second member, extending through the opening in its associated flange, and pivotally connected to its associated yoke leg for swinging movement about an axis transverse to the yoke; and means for supplying fluid under pressure to each of said motors.

58. A shoe conformer comprising: a yoke having a bight and a leg on each side of the bight extending away from the bight, said yoke being adapted to receive a last mounted shoe upper interiorly thereof; a block; a piston pivotally connected to the block outwardly of each yoke leg for swinging movement about an axis transverse to the yoke; a cylinder slidably mounted on each piston for inward movement in response to the application of fluid under pressure to its associated piston; a flange located inwardly of each cylinder, each flange being so located as to be abutted by its associated cylinder upon inward movement of the cylinder; an opening in each flange; a rod connected to each cylinder, extending inwardly through the opening in its associated flange, and pivotally connected to its associated yoke leg for swinging movement about an axis transverse to the yoke; and means for supplying fluid under pressure to each of the pistons.

59. A shoe conformer comprising: a yoke having a bight and a leg on each side of the bight extending away from the bight, said yoke being adapted to receive a last mounted shoe upper interiorly thereof; means for supporting each of the yoke legs; a rear bracket leg positioned rearwardly of the bight; a front bracket leg positioned between the rear bracket leg and the bight; a sleeve slidably mounted in the front bracket leg; a stud extending through the rear bracket leg and the sleeve; a stop member secured to the stud rearwardly of the rear bracket leg; spring means interposed between the rear bracket leg and the sleeve operative to yieldably urge the stud forwardly with the stop member bearing against the rear bracket leg; and a yoke mounting bracket secured to the forward end of the stud in which the bight of the yoke is received.

60. A mechanism for clamping the heel of a shoe assembly comprising: a frame; a pair of spaced parallel bars slidably mounted in the frame; a heel clamp connected to and extending between the bars; a brake straddling each bar, each brake comprising a first brake leg and a second brake leg that is constructed to be movable toward and away from the first brake leg; a drive mechanism, extending between the bars, having a first part and a second part that are so constructed as to be relatively movable with respect to each other; means for operatively connecting the first part to one of said second brake legs and the second part to the other of said second brake legs so that in a first position of the parts the second legs are relatively remote from the first legs and movement of the said parts from said first position to a second position, causes the second legs to be forced toward the first legs; means for initially maintaining said parts in said first position; means for moving the bars in the frame to force the heel clamp against the shoe assembly; and means for thereafter actuating the drive mechanism to move said parts to the second position to thereby cause the brake legs to bear against the bars and lock the clamp in position.

61. A mechanism for clamping the heel of a shoe assembly comprising: a frame; a pair of spaced parallel bars slidably mounted in the frame; a heel clamp connected to and extending between the bars; a brake straddling each bar, each brake comprising a first brake leg and a second brake leg that is constructed to be movable toward and away from the first brake leg; a fluid actuated motor, extending between the bars, having a cylinder and a piston movably mounted in the cylinder; means for operatively connecting the cylinder to one of said second brake legs and the piston to the other of said second brake legs so that in a first position of the piston in the cylinder the second brake legs are relatively remote from the first brake legs and relative movement of the piston and cylinder to a second position causes the second legs to be forced toward the first legs; means for initially maintaining the piston and cylinder in said first position; means for moving the bars in the frame to force the heel clamp against the shoe assembly; and means for thereafter actuating the motor to move the piston and cylinder to the second position to thereby cause the brake legs to bear against the bars and lock the clamp in position.

62. In a machine for pulling a selected portion of a shoe upper about a last and wiping the margin of said upper portion against the corresponding portion of a shoe insole, the combination comprising: a shoe support for supporting a shoe assembly that includes a last having said upper portion draped thereon and the insole located on its bottom while said upper portion is pulled about the last; a frame; a slide movably mounted in the frame; wiping means connected to the slide for movement in unison therewith and mounted for movement with respect to the slide from a retracted to an advanced position; means for initially maintaining the slide in a rearward position relatively remote from the shoe assembly; means for initially maintaining the wiping means in its retracted position; a hold-down so mounted on the slide as to be at a higher elevation than the shoe assembly when the slide is in its rearward position; means for advancing the slide to bring the wiping means to a working position adjacent the shoe assembly; means responsive to said advancement of the slide for causing the hold-down to drop against the shoe assembly; wiper drive means for advancing the wiping means from its retracted position to its advanced position to wipe said margin against said insole; and means for actuating the wiper drive means subsequent to the advancement of the slide.

63. The combination as defined in claim 62 further comprising: means for forcing the hold-down downwardly against the shoe assembly under relatively light pressure after it has dropped against the shoe assembly and prior to the actuation of the wiper drive means.

64. The combination as defined in claim 63 further comprising: means for forcing the hold-down downwardly under relatively heavy pressure when the wiping means has moved to its advanced position.

65. In a machine for pulling a selected portion of a shoe upper about a last and wiping the margin of said upper portion against the corresponding portion of a shoe insole, the combination comprising: a shoe support for supporting a shoe assembly that includes a last having said upper portion draped thereon and the insole located on its bottom while said upper portion is pulled about the last; a frame; a slide mounted in the frame for movement in a predetermined direction in a predetermined plane; wiping means connected to the slide for movement in unison therewith and mounted for movement with respect to the slide from a retracted to an advanced position; means for initially maintaining the slide in a rearward position relatively remote from the shoe assembly; a lever pivotally mounted on the slide on an axis that lies in a plane that is substantially parallel to said predetermined plane and that extends in a direction that is transverse to the aforementioned direction, said lever having a forward leg having a hold-down thereon extending generally forwardly and upwardly from said axis and a rearward leg extending generally downwardly and rearwardly from said axis, the lever legs being so constructed and arranged that the forward leg is urged downwardly about the axis and the rearward leg is urged upwardly about the axis; an abutment fixed on the frame positioned to limit the upward swinging movement of the rearward lever leg when the slide is in its rearward position so that the hold-down is at a higher elevation than the shoe assembly; means for advancing the slide to bring the wiping means to a working position adjacent the shoe assembly and to cause the rearward lever leg to depart from the abutment to permit the lever to swing about its axis in a direction to cause the hold-down to drop against the shoe assembly; wiper drive means for advancing the wiping means from its retracted to its advanced position to wipe said margin against said insole; and means for actuating the wiper drive means subsequent to the advancement of the slide.

66. The combination as defined in claim 65 further comprising: a cam positioned in alignment with the rearward lever leg after the hold-down has dropped against the shoe assembly; and means, operative after the hold-down has dropped against the shoe assembly and prior to the actuation of the wiper drive means, to force the cam against the rearward lever leg under a predetermined pressure in such a path as to force the hold-down downwardly against the shoe assembly.

67. The combination as defined in claim 66 further comprising: means, operative when the wiping means has moved to its advanced position, for forcing the cam against the rearward lever leg in said path under a second pressure that is greater than the first mentioned pressure to force the hold-down downwardly against the shoe assembly under relatively heavy pressure.

68. In a machine for pulling the toe portion of a shoe upper about a last and wiping the margin of said upper portion against the toe portion of a shoe insole, the combination comprising: a shoe support, mounted for heightwise movement, for supporting bottom-down a shoe assembly that includes a last having said upper portion draped thereon and the insole located on its bottom; a frame; a slide movably mounted in the frame; wiping means connected to the slide for movement in unison therewith and mounted for movement with respect to the slide from a retracted to an advanced position; a shoe conforming means mounted on the slide above the wiping means; means for initially maintaining the shoe support in a lowered position wherein the bottom of the insole is below the top of the wiping means; means for pulling said portion of the upper about the last while the shoe support is in said lowered position; means for initially maintaining the slide in a rearward position relatively remote from the shoe assembly; means for initially maintaining the wiping means in its retracted position; a hold-down so mounted on the slide as to be at a higher elevation than the shoe assembly when the slide is in its rearward position; means for advancing the slide to bring the wiping means and shoe conforming means to a working position adjacent the shoe assembly; means responsive to said advancement of the slide for causing the hold-down to drop against the top of the shoe assembly; means operative when the slide has arrived at its working position to raise the shoe support at least an amount sufficient to bring the bottom of the insole to the level of the top of the wiping means and thereby bring the shoe assembly to a wiping position, said conforming means snugly conforming the upper to the shape of the last and the hold-down rising with the shoe assembly during the rise of the shoe assembly; means operative when the shoe assembly has arrived at said wiping position to force the hold-down downwardly against the shoe assembly under a predetermined pressure; wiper drive means for advancing the wiping means from its retracted to its advanced position to wipe said margin against said insole; and means for actuating the wiper drive means subsequent to the application of said pressure.

69. The combination as defined in claim 68 wherein said shoe support raising means comprises: a motor connected to the shoe support; a first motor actuating means mounted on the frame and a second motor actuating means mounted on the slide, said motor actuating means being so constructed and arranged as to be brought into cooperative relationship upon advancement of said slide to said working position; and means responsive to the bringing of said motor actuating means into cooperative relationship to actuate said motor to raise the shoe support.

70. The combination as defined in claim 68 further comprising: means for forcing the hold-down downwardly under a second pressure that is greater than the first mentioned pressure when the wiping means has moved to its advanced position.

71. In a machine for pulling the toe portion of a shoe upper about a last and wiping the margin of said upper portion against the toe portion of a shoe insole, the combination comprising: a shoe support, mounted for heightwise movement, for supporting bottom-down a shoe assembly that includes a last having said upper portion draped thereon and the insole located on its bottom; a frame; a slide mounted in the frame for movement in a predetermined direction in a predetermined plane; wiping means connected to the slide for movement in unison therewith and mounted for movement with respect to the slide from a retracted to an advanced position; a shoe conforming means mounted on the slide above the wiping means; means for initially maintaining the shoe support in a lowered position wherein the bottom of the insole is below the top of the wiping means; means for pulling said portion of the upper about the last while the shoe support is in said lowered position; means for initially maintaining the slide in a rearward position relatively remote from the shoe assembly; means for initially maintaining the wiping means in its retracted position; a lever pivotally mounted on the slide on an axis that lies in a plane that is substantially parallel to said predetermined plane and that extends in a direction that is transverse to the aforementioned direction, said lever having a forward leg having a hold-down thereon extending generally forwardly and upwardly from said axis and a rearward leg extending generally downwardly and rearwardly from said axis, the lever legs being so constructed and arranged that the forward leg is urged downwardly about the axis and the rearward leg is urged upwardly about the axis; an abutment fixed on the frame positioned to limit the upward swinging movement of the rearward lever leg when the slide is in its rearward position so that the hold-down is at a higher elevation than the shoe assembly; means for advancing the slide to bring the wiping means and the shoe conforming means to a working position adjacent the shoe assembly and to cause the rearward lever leg to depart from the abutment to permit the lever to swing about its axis in a direction to cause the hold-down to drop against the top of the shoe assembly; means operative when the slide has arrived at its working position to raise the shoe support at least an amount sufficient to bring the bottom of the insole to the level of the top of the wiping means and thereby bring the shoe assembly to a wiping position, said conforming means snugly conforming the upper to the shape of the last and the hold-down rising with the shoe assembly about said axis during the rise of the shoe assembly; a cam positioned in alignment with the rearward lever leg after the shoe assembly has risen to the wiping position; means operative when the shoe assembly has arrived at said wiping position to force the cam against the rearward lever leg under a predetermined pressure in such a path as to force the hold-down downwardly against the shoe assembly; wiper drive means for advancing the wiping means from its retracted to its advanced position to wipe said margin against said insole; and means for actuating the wiper drive means subsequent to the application of said pressure.

72. The combination as defined in claim 71 wherein said shoe support raising means comprises: a motor connected to the shoe support; a first motor actuating means mounted on the frame and a second motor actuating means mounted on the slide, said motor actuating means being so constructed and arranged as to be brought into cooperative relationship upon advancement of said slide to said working position; and means responsive to the bringing of said motor actuating means into cooperative relationship to actuate said motor to raise the shoe support.

73. The combination as defined in claim 71 further comprising: means, operative when the wiping means has moved to its advanced position, for forcing the cam against the rearward lever leg in said path under a second pressure that is greater than the first mentioned pressure to force the hold-down downwardly against the shoe assembly under relatively heavy pressure.

74. In a lasting machine for wiping the margin of an end of a shoe upper draped on a last against a shoe insole located on the bottom of the last, wiping means comprising: a pair of shoe end embracing wipers having surfaces that diverge forwardly from a vertex; a plate movably supporting the wipers for movement from a retracted to an advanced position; a guide arrangement interposed between the plate and the wipers constraining the movement of the wipers on the plate in such a manner that when the wipers are advanced from their retracted position they are first swung about the vertex from a first position wherein the angle subtended by said surfaces is at a predetermined maximum to a second position wherein the angle subtended by said surfaces is at a predetermined minimum and then are moved to have a component of forward translatory motion; manually operable means for swinging the wipers about the vertex through said guide arrangement to a selected position that is intermediate said first and second positions; and drive means operable to cause the wipers to move to their advanced position from said intermediate position.

75. The machine as defined in claim 74 wherein said guide arrangement comprises cooperative pins and slots.

76. In a lasting machine for wiping the margin of an end of a shoe upper draped on a last against a shoe insole located on the bottom of the last, wiping means comprising: a pair of shoe end embracing wipers having surfaces that diverge forwardly from a vertex; a plate movably supporting the wipers for movement from a retracted to an advanced position; pin and slot connections between the plate and wipers so constructed and arranged that when the wipers are advanced from their retracted position they are first swung about the vertex from a first position wherein the angle subtended by said surfaces is at a predetermined maximum to a second position wherein the angle subtended by said surfaces is at a predetermined minimum and then are moved to have a component of forward translatory motion; a housing located rearwardly of the wipers; a block located between the housing and the wipers; means mounting the housing and block for forward and rearward movement; link means connecting the block and wipers operable to move the wipers with respect to the plate in response to movement of the block; manually operable means for adjusting the spacing between the housing and block to thereby swing the wipers about the vertex to a selected position that is intermediate said first and second positions; and powered means connected to the housing to move it and the block forwardly to thereby cause the wipers to move to their advanced position from said intermediate position.

77. In a lasting machine for wiping the margin of an end of a shoe upper draped on a last against a shoe insole located on the bottom of the last, wiping means comprising: a pair of shoe end embracing wipers having surfaces that diverge forwardly from a vertex; and means for driving said wipers operable automatically to impart a concomitant inward swinging movement of the wipers about said vertex and forward translatory movement of the wipers followed by an exclusive forward translatory movement of the wipers.

78. In a lasting machine for wiping the margin of an end of a shoe upper draped on a last against a shoe insole located on the bottom of the last, wiping means comprising: a pair of shoe end embracing wipers having surfaces that diverge forwardly from a vertex; a plate movably supporting the wipers for movement from a retracted to an advanced position; a connection between the plate and wipers so constructed and arranged that when the wipers are advanced from their retracted position they are concomitantly swung inwardly about the vertex and translated forwardly and thereafter are translated forwardly; and drive means operable to cause the wipers to move to their advanced position from said retracted position.

79. In a lasting machine for wiping the margin of an end of a shoe upper draped on a last against a shoe insole located on the bottom of the last, wiping means comprising: a pair of shoe end embracing wipers having surfaces that diverge forwardly from a vertex; a plate movably supporting the wipers for movement from a retracted to an advanced position; pin and slot connections between the plate and wipers so constructed and arranged that when the wipers are advanced from their retracted position they are concomitantly swung inwardly about the vertex and translated forwardly and thereafter are translated forwardly; a block located rearwardly of the wipers; means mounting the block for forward and rearward movement; link means connecting the block and wipers operable to move the wipers with respect to the plate in response to movement of the block; and powered means connected to the block to move it forwardly and thereby cause the wipers to move to their advanced position from said retracted position.

80. A wiping mechanism comprising: a block; a pair of symmetrically disposed wiping units, that include wipers having surfaces that diverge forwardly of a vertex to wipe the margin of a shoe upper against a shoe insole in response to inward swinging movement of the wiping units about the vertex, mounted on the block for inward swinging movement about said vertex; a tool unit supported for forward movement on the block between the wiping units; a forwardly projecting shoe upper treating tool on said tool unit; means pivotally connecting a pair of links at their rear ends to the tool unit so that the links extend forwardly from the tool unit; means pivotally connecting the forward end of each link to a separating wiping unit; and means so constructing and arranging the links and their pivotal connections that upon inward swinging movement of the wiping units about the vertex the forward ends of the links move forwardly a lesser distance than the rear ends of the links to thereby cause the tool unit to be moved forwardly along the block with respect to the wiping units and enable the tool to perform an operation on the shoe upper.

81. The mechanism as defined in claim 80 wherein said tool is a knife having a forwardly directed cutting edge; wherein said cutting edge is initially located rearwardly of said wiper surfaces; and wherein the links and their pivotal connections are so constructed and arranged as to cause the cutting edge to be projected forwardly of said wiper surfaces during the inward swinging movement of the wiping units.

82. A wiping mechanism comprising: a pair of symmetrically disposed wiping units that include wipers having surfaces that diverge forwardly of a vertex to wipe the margin of a shoe upper against a shoe insole in response to inward swinging movement of the wiping units about the vertex; drive means operative to swing the wiping units about said vertex; a knife unit straddling the wiping units having a forwardly directed cutting edge and mounted for sliding movement on the wiping units in a generally forward direction that lies on the plane of symmetry of the wiping units, said cutting edge being initially located rearwardly of said surfaces; means pivotally connecting a pair of links at their rear ends to the knife unit so that the links extend forwardly from the knife unit; means pivotally connecting the forward end of each link to a separate wiping unit; and means so constructing and arranging the links and their pivotal connections that upon inward swinging movement of the wiping units about the vertex the forward ends of the links move forwardly a lesser distance than the rear ends of the links to thereby cause the knife unit to be moved forwardly and the cutting edge to be projected forwardly of said wiper surfaces.

83. The mechanism as defined in claim 82 further comprising: means for causing the knife unit to vibrate laterally of said line of symmetry during the forward movement of the knife unit.

84. A wiping mechanism comprising: a pair of symmetrically disposed wiping units that include wipers having surfaces that diverge forwardly of a vertex to wipe the margin of a shoe upper against a shoe insole in response to inward swinging movement of the wiping units about the vertex; drive means operative to swing the wiping units about said vertex; a knife unit straddling the wiping units having a forwardly directed cutting edge and mounted for sliding movement on the wiping units in a generally forward direction that lies on the plane of symmetry of the wiping units, said cutting edge being initially located rearwardly of said surfaces; means so connecting the knife unit and the wiping units that upon inward swinging movement of the wiping units about the vertex the knife unit is caused to be moved forwardly and the cutting edge is projected forwardly of said wiper surfaces; and means cooperative with the knife unit for causing it to vibrate laterally of said line of symmetry during the forward movement of the knife unit.

85. A wiping mechanism comprising: a block; a pair of symmetrically disposed wiping units movably mounted on the block, said wiping units having surfaces that diverge forwardly of a vertex to wipe the margin of a shoe upper against a shoe insole in response to inward swinging movement of the wiping units about the vertex; drive means operative to swing the wiping units about said vertex; a knife unit straddling the wiping units having a forwardly directed cutting edge and a surface that is slidable on a surface of the block, said knife unit being mounted for sliding movement on the wiping units in a generally forward direction that lies on the plane of symmetry of the wiping units, said cutting edge being initially located rearwardly of said wiping unit surfaces; a forwardly extending undulating slot in one of said knife unit and block surfaces and a pin projecting from the other of said knife unit and block surfaces into the slot; and means so connecting the knife unit and the wiping units that upon inward swinging of the wiping units about the vertex the knife unit is caused to be moved forwardly with the cutting edge projected forwardly of said wiping unit surfaces and the knife unit is vibrated laterally of said line of symmetry of the knife unit during the forward movement of the knife unit due to the movement of the pin in the slot.

86. In a machine having a plurality of motors, means for actuating said motors in a predetermined sequence comprising: a bar mounted for heightwise movement and normally positioned in a lower position; a stud overlying the bar and mounted to be yieldably urged downwardly; a pin movably mounted in the stud so as to be yieldably urged downwardly of the stud into engagement with the bar; means responsive to raising the bar to move the pin upwardly of the stud to actuate certain of said motors in said predetermined sequence; and means responsive to a further raising of the bar to move the stud upwardly to resume the actuation of the motors in said predetermined sequence.

87. In a machine having a plurality of motors, means for actuating said motors in a predetermined sequence comprising: a bar mounted for heightwise movement and normally positioned in a lower position; a stud overlying the bar; first, relatively strong, spring means yieldably urging the stud downwardly; a pin movably mounted in the stud; second, a relatively weak, spring means yieldably urging the pin downwardly into engagement with the bar; means responsive to raising the bar to move the pin upwardly of the stud against the force of the second spring means until the bar engages the stud to actuate certain of said motors in said predetermined sequence; and means responsive to a further raising of the bar to move the stud upwardly against the force of the first spring means to resume the actuation of the motors in said predetermined sequence.

References Cited
UNITED STATES PATENTS

| | | | |
|---|---|---|---|
| 1,010,800 | 12/1911 | Pym | 12—14.2 |
| 1,634,510 | 7/1927 | Pym | 12—12.4 |
| 2,024,175 | 12/1935 | Le Rette | 12—12.4 |
| 2,104,137 | 1/1938 | Pym | 12—12.4 |
| 2,287,970 | 6/1942 | Burby | 12—14.2 |
| 2,408,022 | 9/1946 | Jorgensen | 12—10.5 |
| 2,887,696 | 5/1959 | Finn | 12—10.1 X |
| 3,039,121 | 6/1962 | Weinschenk | 12—145 X |
| 3,102,282 | 9/1963 | Kamborian | 12—10.5 |
| 3,102,284 | 9/1963 | Hooper et al. | 12—14.4 |
| 3,157,897 | 11/1964 | Morrill | 12—10.5 |

PATRICK D. LAWSON, *Primary Examiner.*

UNITED STATES PATENT OFFICE
CERTIFICATE OF CORRECTION

Patent No. 3,332,096         Dated   July 25, 1967

Inventor(s) Jacob S. Kamborian et al

It is certified that error appears in the above-identified patent and that said Letters Patent are hereby corrected as shown below:

Column 19: line 65, "extend" should read --extent--.
Column 20: line 13, "wiper" should read --wiped--.
Column 21: line 31, the second occurrence of "the" should be deleted.
Column 38: line 27, "separating" should read --separate--.

SIGNED AND SEALED

MAR 24 1970

(SEAL)
Attest:

Edward M. Fletcher, Jr.
Attesting Officer

WILLIAM E. SCHUYLER, JR.
Commissioner of Patents